(12) United States Patent
Hu et al.

(10) Patent No.: US 12,149,168 B1
(45) Date of Patent: Nov. 19, 2024

(54) T-TYPE LCL RESONANT CONVERTER AND ITS SOFT SWITCHING MODULATION METHOD UNDER FULL POWER RANGE

(71) Applicant: Changshu Institute of Technology, Changshu (CN)

(72) Inventors: Song Hu, Changshu (CN); Rui Wang, Changshu (CN); Huigang Xu, Changshu (CN); Jicheng Liu, Changshu (CN); Yong Yang, Changshu (CN)

(73) Assignee: Changshu Institute of Technology, Changshu (CN)

( * ) Notice: Subject to any disclaimer, the term of this patent is extended or adjusted under 35 U.S.C. 154(b) by 0 days.

(21) Appl. No.: 18/611,676

(22) Filed: Mar. 20, 2024

Related U.S. Application Data

(63) Continuation of application No. PCT/CN2024/081134, filed on Mar. 12, 2024.

(30) Foreign Application Priority Data

Jun. 19, 2023 (CN) .......................... 202310720544.4

(51) Int. Cl.
  *H02M 3/00* (2006.01)
  *H02M 1/00* (2006.01)
  *H02M 3/335* (2006.01)
(52) U.S. Cl.
  CPC ........... *H02M 3/01* (2021.05); *H02M 1/0058* (2021.05); *H02M 3/33573* (2021.05); *H02M 3/33576* (2013.01)

(58) Field of Classification Search
  CPC .. H02M 3/01; H02M 1/0058; H02M 3/33573; H02M 3/33576
  See application file for complete search history.

(56) References Cited

U.S. PATENT DOCUMENTS

| | | | |
|---|---|---|---|
| 2018/0219501 A1* | 8/2018 | Wagoner | H02M 1/084 |
| 2021/0288576 A1* | 9/2021 | Rizzolatti | H02M 1/007 |
| 2022/0416684 A1* | 12/2022 | Awal | H02M 7/219 |
| 2023/0073099 A1* | 3/2023 | Lou | H02M 1/0035 |

FOREIGN PATENT DOCUMENTS

CN        111969856 A        11/2020

\* cited by examiner

*Primary Examiner* — Kyle J Moody

(57) ABSTRACT

A T-type inductor-capacitor-inductor (LCL) resonant converter and its soft switching modulation method under a full power range. A full bridge inverter circuit is provided at a primary side of a T-type inductor-capacitor-inductor (LCL) resonant converter. The full bridge inverter circuit includes four metal-oxide-semiconductor (MOS) transistors. A half bridge rectifier circuit is provided at a secondary side of the T-type LCL resonant converter, and the half bridge rectifier circuit includes two MOS transistors and two equalizing capacitors. The soft switching modulation method for the T-type LCL resonant converter under a full power range is provided based on the T-type LCL resonant converter. The soft switching modulation method requires all switching transistors to operate at a duty cycle of 50% within one cycle. A high-frequency alternating voltage of the primary side has a symmetrical waveform, and a high-frequency alternating voltage of the secondary side has a square waveform.

8 Claims, 18 Drawing Sheets

T-TYPE LCL RESONANT CONVERTER AND ITS SOFT SWITCHING MODULATION METHOD UNDER FULL POWER RANGE

TECHNICAL FIELD

The present disclosure relates to the technical field of modulation of high-frequency isolated direct current to direct current (DC-DC) resonant converters, and specifically to a T-type inductor-capacitor-inductor (LCL) resonant converter and its soft switching modulation method under a full power range.

BACKGROUND

High-frequency isolated DC-DC resonant converters are used in DC microgrids, solid-state transformers, and electric vehicles (EVs). Among them, dual active bridge (DAB) converters have been widely studied due to their advantages such as galvanic isolation, high switching frequency, low electromagnetic interference (EMI), and easy implementation of soft switching. However, DAB converters are prone to lose soft switching when voltage mismatch occurs, resulting in a sharp decrease in efficiency of the converters. Therefore, scholars have proposed high-frequency isolated DC-DC resonant converters, which are easier to achieve soft switching and have an approximate sinusoidal current compared to DAB converters. Common high-frequency isolated DC-DC resonant converters include series resonant converters, parallel resonant converters, and (inductor-inductor-capacitor) LLC resonant converters, which improve the efficiency of the converters, but still cannot achieve soft switching under a full power range.

In order to improve the efficiency of high-frequency isolated DC-DC converters, scholars adopt different modulation strategies to reduce switching losses and improve efficiency. Single-phase-shift (SPS) is the simplest modulation strategy, but it is difficult for a switching transistor to achieve soft switching when voltage mismatch occurs. Extended-phase-shift (EPS) control and dual-phase-shift (DPS) control can reduce reactive current and current stress, and increase a power range of soft switching, but lose the soft switching at light loads. Triple-phase-shift (TPS) control further enhances a power range of soft switching of the converters under light loads and effectively reduces reactive current and current stress, but the complexity of control increases sharply, and it is still unable to achieve soft switching for all switches.

A Chinese patent with an application number of 2022116095932 discloses a capacitor-inductor-capacitor-inductor-capacitor (CLCLC) resonant converter obtained by adding only two additional capacitors to an LCL resonant converter. An asymmetric modulation strategy is provided based on the CLCLC resonant converter. The asymmetric modulation strategy is as follows: a positive half-cycle pulse width of the primary side voltage is adjustable, a negative half-cycle pulse width of the primary side voltage is fixed to $\pi$, a positive half-cycle pulse width of the secondary side voltage is adjustable, and a negative half-cycle pulse width is fixed to $\pi$; in addition, the secondary side voltage has a phase lag relative to the primary side voltage. The asymmetric modulation strategy can only be applied to the CLCLC resonant converter and cannot be applied to other resonant tanks with different properties.

SUMMARY

A purpose of the disclosure is to provide a T-type inductor-capacitor-inductor (LCL) resonant converter and its soft switching modulation method under a full power range. The soft switching modulation method is suitable for the T-type LCL resonant converter. The soft switching modulation method can achieve soft switching operations of all switching transistors under the full power range and minimize switching losses, which greatly improves efficiency of the T-type LCL resonant converter.

The technical solution of the present disclosure for achieving the above purpose is as follows:

a T-type LCL resonant converter is provided and includes a primary side full bridge, a resonant tank, a high-frequency transformer, and a secondary side half bridge connected in that order; the primary full bridge includes a switching transistor $S_1$, a switching transistor $S_2$, a switching transistor $S_3$, and a switching transistor $S_4$; the switching transistor $S_1$, the switching transistor $S_2$, the switching transistor $S_3$, and the switching transistor $S_4$ form a full bridge inverter circuit; the resonant tank includes a first resonant inductor $L_1$, a second resonant inductor $L_2$, and a resonant capacitor C disposed at a primary side; the first resonant inductor $L_1$ is connected to the second resonant inductor $L_2$; the first resonant inductor $L_1$ is connected to a first connection point of the primary side full bridge; an end of the resonant capacitor C is connected to a connection point between the first resonant inductor $L_1$ and the second resonant inductor $L_2$; another end of the resonant capacitor C is connected to a second connection point of the primary side full bridge; a turn ratio of the high-frequency transformer is 1:n, where "n" is defined; the secondary side half bridge includes a switching transistor $S_5$ and a switching transistor $S_6$; the switching transistor $S_5$, the switching transistor $S_6$, an equalizing capacitor $C_{o1}$, and an equalizing capacitor $C_{o2}$ form a half bridge rectifier circuit.

The present disclosure further provides a soft switching modulation method for the T-type LCL resonant converter under the full power range. The soft switching modulation method includes the following steps:

step S01: in a cycle, adjusting pulse widths of the switching transistor $S_1$, the switching transistor $S_2$, the switching transistor $S_3$, and the switching transistor $S_4$ to obtain a high-frequency alternating voltage $v_{ab}$ of the primary side with a symmetrical waveform having three electrical levels, an amplitude equal to $V_{in}$, an adjustable positive pulse width, and an adjustable negative pulse width; in the cycle, adjusting pulse widths of the switching transistor $S_5$ and the switching transistor $S_6$ to obtain a high-frequency alternating voltage $v_{cd}$ of the secondary side with a square waveform having two electrical levels, an amplitude equal to $0.5\ V_{out}$, a constant positive pulse width equal to $\pi$, and a constant negative pulse width equal to $\pi$; and $V_{in}$ represents an input voltage and $V_{out}$ represents an output voltage; and step S02: adjusting a current phase of a current it of the resonant inductor $L_1$ to $(\pi-\alpha)/2$, thereby enabling the T-type LCL resonant converter to achieve soft switching operations of the switching transistor $S_1$, the switching transistor $S_2$, the switching transistor $S_3$, the switching transistor $S_4$, the switching transistor $S_5$, and the switching transistor $S_6$ under the full power range.

In an embodiment, in the step S01, the adjusting pulse widths of the switching transistor $S_1$, the switching transistor $S_2$, the switching transistor $S_3$, and the switching transistor $S_4$ to obtain a high-frequency alternating voltage $v_{ab}$ of the primary side includes:

adjusting the pulse widths of the switching transistor $S_1$, the switching transistor $S_2$, the switching transistor $S_3$, and the switching transistor $S_4$ to achieve complementary conduction of the switching transistor $S_1$, the switching transistor $S_2$, the switching transistor $S_3$, and the switching transistor $S_4$ with a duty cycle of 50%, adjusting the switching transistor $S_4$ to lag the switching transistor $S_1$ by a target angle, thereby obtaining the high-frequency alternating voltage $v_{ab}$ of the primary side with the symmetrical waveform having the three electrical levels and the amplitude equal to $V_{in}$; and α represents an angle that makes the switching transistor $S_1$ and the switching transistor $S_4$ be turned on simultaneously, and the adjustable positive pulse width and the adjustable negative pulse width are obtained by adjusting the angle α.

In an embodiment, in the step S01, the adjusting pulse widths of the switching transistor $S_5$ and the switching transistor $S_6$ to obtain the high-frequency alternating voltage $v_{cd}$ of the secondary side includes:

adjusting the pulse widths of the switching transistor $S_5$ and the switching transistor $S_6$ to achieve complementary conduction of the switching transistor $S_5$ and the switching transistor $S_6$ with a duty cycle of 50%, and adjusting a fundamental wave of the square waveform to lag a fundamental wave of the symmetrical waveform by a phase angle φ, thereby obtaining the square waveform having the two electrical levels and the amplitude equal to 0.5 $V_{out}$.

In an embodiment, in the step 02, the current phase of the current $i_1$ of the resonant inductor $L_1$ to is adjusted to $(\pi-\alpha)/2$.

In an embodiment, the current $i_1$ of the resonant inductor $L_1$ and a current $i_2$ of the resonant inductor $L_2$ are calculated by:

based on an equivalent circuit of the T-type LCL resonant converter in a phasor domain, and using Kirchhoff's current law (KCL) and Kirchhoff's voltage law (KVL) to obtain two expressions:

$$\overline{v_{ab}} = j\left(\omega_s L_1 - \frac{1}{\omega_s C}\right)\overline{i_1} + \frac{j}{\omega_s C}\overline{i_2}$$

$$\overline{v'_{cd}} = j\left(\frac{1}{\omega_s C} - \omega_s L_2\right)\overline{i_2} - \frac{j}{\omega_s C}\overline{i_1}$$

where $\overline{v_{ab}}$ represents a phasor expression of $v_{ab}$, $\overline{v'_{cd}}$ represents a phasor expression of $v_{cd}$ converted to the primary side, $\overline{i_1}$ represents a phasor expression of the current $i_1$ of the resonant inductor $L_1$, $\overline{i_2}$ represents a phasor expression of the current $i_2$ of the resonant inductor $L_2$, $\omega_s$ represents a switching angular frequency, and C represents a resonant capacitance;

when the T-type LCL resonant converter operates in a resonant mode, the switching angular frequency $\omega_s$ is equal to a resonant angular frequency $\omega_r$, and the following formula is obtained:

$$\omega_s = \omega_r = \sqrt{\frac{C}{L_r}};$$

in the formula, $$L_r = L_1 = L_2,$$

simplifying the two expressions as:

$$\overline{v_{ab}} = \frac{j}{\omega_s C}\overline{i_2}$$

$$\overline{v'_{cd}} = -\frac{j}{\omega_s C}\overline{i_1}$$

performing, by using a fundamental harmonic approximation method, a steady-state analysis on the high-frequency alternating voltage $v_{ab}$ and the high-frequency alternating voltage $v_{cd}$, thereby obtaining a Fourier fundamental wave phasor expression of the high-frequency alternating voltage $v_{ab}$ and a Fourier fundamental wave phasor expression of the high-frequency alternating voltage $v_{cd}$ expressed as:

$$\overline{v_{ab}} = \frac{4V_{in}}{\sqrt{2}\pi}\sin\frac{\alpha}{2}\angle 0$$

$$\overline{v'_{cd}} = \frac{2V_{out}}{\sqrt{2}n\pi}\angle -\varphi$$

obtaining, based on the Fourier fundamental wave phasor expression of the high-frequency alternating voltage $v_{ab}$ and the Fourier fundamental wave phasor expression of the high-frequency alternating voltage $v_{cd}$, a Fourier fundamental wave phasor expression of the current $i_1$ and a Fourier fundamental wave phasor expression of the current $i_2$ expressed as:

$$\overline{i_1} = \frac{2V_{out}}{\sqrt{2}n\pi\omega_s L_r}\angle -\varphi + \frac{\pi}{2}$$

$$\overline{i_2} = \frac{4V_{in}}{\sqrt{2}\pi\omega_s L_r}\sin\frac{\alpha}{2}\angle -\frac{\pi}{2}$$

where $V_{in}$ represents the input voltage and $V_{out}$ represents the output voltage.

In an embodiment, when the current phase of the current $i_1$ of the resonant inductor $L_1$ is adjusted to $$(\pi-\alpha)/2, -\varphi + \frac{\pi}{2} = -\left(\frac{\pi-\alpha}{2}\right),$$

that is to say $$, \varphi = \pi - \frac{\alpha}{2};$$

and an output power $P_o$ is expressed as $$P_o = \frac{4V_{in}V_{out}}{n\pi^2\omega_s L_r}\sin^2\frac{\alpha}{2}.$$

The present disclosure further provides a soft switching modulation system for the above T-type LCL resonant converter under the full power range. The soft switching modulation system includes:

a primary side high-frequency voltage waveform adjustment part, configured for: in a cycle, adjusting pulse widths of the switching transistor $S_1$, the switching transistor $S_2$, the switching transistor $S_3$, and the switching transistor $S_4$ to obtain a high-frequency alternating voltage $v_{ab}$ of the primary side with a symmetrical waveform having three electrical levels, an amplitude equal to $V_{in}$, an adjustable positive pulse width, and an adjustable negative pulse width;

a secondary side high-frequency voltage waveform adjustment part, configured for: in the cycle, adjusting pulse widths of the switching transistor $S_5$ and the switching transistor $S_6$ to obtain a high-frequency alternating voltage $v_{cd}$ of the secondary side with a square waveform having two electrical levels, an amplitude equal to $0.5\,V_{out}$, a constant positive pulse width equal to $\pi$, and a constant negative pulse width equal to $\pi$; $V_{in}$ represents an input voltage and $V_{out}$ represents an output voltage; and a phase adjustment part, configured for: adjusting a current phase of a current $i_1$ of the resonant inductor $L_1$ to $(\pi-\alpha)/2$, thereby enabling the T-type LCL resonant converter to achieve soft switching operations of the switching transistor $S_1$, the switching transistor $S_2$, the switching transistor $S_3$, the switching transistor $S_4$, the switching transistor $S_5$, and the switching transistor $S_6$ under the full power range; $\alpha$ represents an angle that makes the switching transistor $S_1$ and the switching transistor $S_4$ be turned on simultaneously.

In an embodiment, in the primary side high-frequency voltage waveform adjustment part, the adjusting pulse widths of the switching transistor $S_1$, the switching transistor $S_2$, the switching transistor $S_3$, and the switching transistor $S_4$ to obtain a high-frequency alternating voltage $v_{ab}$ of the primary side includes:

adjusting the pulse widths of the switching transistor $S_1$, the switching transistor $S_2$, the switching transistor $S_3$, and the switching transistor $S_4$ to achieve complementary conduction of the switching transistor $S_1$, the switching transistor $S_2$, the switching transistor $S_3$, and the switching transistor $S_4$ with a duty cycle of 50%, adjusting the switching transistor $S_4$ to lag the switching transistor $S_1$ by a target angle, thereby obtaining the high-frequency alternating voltage $v_{ab}$ of the primary side with the symmetrical waveform having the three electrical levels and the amplitude equal to $V_{in}$; and adjusting the angle $\alpha$ to obtain the adjustable positive pulse width and the adjustable negative pulse width.

The present disclosure further provides a non-transitory computer storage medium. The computer storage medium stores a computer program, and the soft switching modulation method for the above T-type LCL resonant converter under the full power range is performed when the computer program is executed.

Compared with the prior art, the present disclosure has the following beneficial effects.

(1) The T-type LCL resonant converter has a topology structure which has the property of immittance network. A phase difference between the input voltage and the output current is 90°, and a phase difference between the output voltage and the input current is 90°, which can maintain unit power factor (UPF) operations of the primary side and the secondary side, thereby reducing conduction loss.

(2) The secondary side of the T-type LCL resonant converter adopts a half bridge structure, which reduces the voltage stress of the switching transistors and the cost.

(3) The soft switching modulation method of the present disclosure requires all switching transistors to operate at a duty cycle of 50% within one cycle. The high-frequency alternating voltage of primary side has a symmetrical waveform with three electrical levels, and the high-frequency alternating voltage of the secondary side has a square waveform with two electrical levels. The fundamental wave of the square waveform lags the fundamental wave of the symmetrical waveform by the phase angle $\varphi$. By adjusting the current phase of the resonant inductor, the soft switching modulation method enables the converter to achieve soft switching operations of all switching transistors under the full power range, thereby minimizing switching losses and greatly improving the efficiency of the T-type LCL resonant converter.

DETAILED DESCRIPTION OF EMBODIMENTS

The principle of the present disclosure is as follows: a full bridge inverter circuit is provided at a primary side of a T-type inductor-capacitor-inductor (LCL) resonant converter of the present disclosure, and the full bridge inverter circuit includes four metal-oxide-semiconductor (MOS) transistors. A half bridge rectifier circuit is provided at a secondary side of the T-type LCL resonant converter, and the half bridge rectifier circuit includes two MOS transistors and two equalizing capacitors, which reduces the voltage stress of the switching transistors and the cost. The primary side is connected to the secondary side through a T-type LCL tank and a high-frequency transformer, and therefore the T-type LCL resonant converter has the property of immittance network; a phase difference between the input voltage and the output current is 90°, and a phase difference between the output voltage and the input current is 90°, which can maintain unit power factor (UPF) operations of the primary side and the secondary side, thereby reducing conduction loss. Based on the T-type LCL resonant converter, a soft switching modulation method for the T-type LCL resonant converter under a full power range is provided. The soft switching modulation method of the present disclosure requires all switching transistors to operate at a duty cycle of 50% within one cycle. A high-frequency alternating voltage of the primary side has a symmetrical waveform with three electrical levels, and a high-frequency alternating voltage of the secondary side has a square waveform with two electrical levels. The fundamental wave of the square waveform lags the fundamental wave of the symmetrical waveform by a phase angle φ. By adjusting the current phase of the resonant inductor, the soft switching modulation method enables the converter to achieve soft switching operations of all switching transistors under the full power range, thereby minimizing switching losses and greatly improving the efficiency of the T-type LCL resonant converter.

Figure 1:
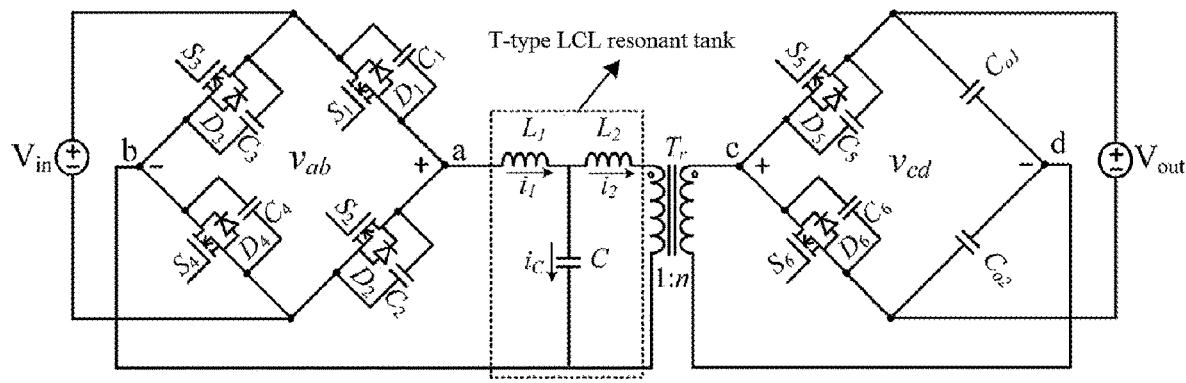
FIG. 1 illustrates a structural schematic diagram of a T-type inductor-capacitor-inductor (LCL) resonant converter.

As shown in FIG. 1, a T-type LCL resonant converter is provided. The T-type LCL resonant converter includes a primary side full bridge, a resonant tank, a high-frequency transformer, and a secondary side half bridge connected in that order. The primary full bridge includes a switching transistor $S_1$, a switching transistor $S_2$, a switching transistor $S_3$, and a switching transistor $S_4$. The switching transistor $S_1$, the switching transistor $S_2$, the switching transistor $S_3$, and the switching transistor $S_4$ form a full bridge inverter circuit. The resonant tank includes a first resonant inductor $L_1$, a second resonant inductor $L_2$, and a resonant capacitor C disposed at the primary side. The first resonant inductor $L_1$ is connected to the second resonant inductor $L_2$. The first resonant inductor $L_1$ is connected to a first connection point of the primary side full bridge. An end of the resonant capacitor C is connected to a connection point between the first resonant inductor $L_1$ and the second resonant inductor $L_2$, and another end of the resonant capacitor C is connected to a second connection point of the primary side full bridge. A turn ratio of the high-frequency transformer is 1:n, where "n" is defined. The secondary side half bridge includes a switching transistor $S_5$ and a switching transistor $S_6$. The switching transistor $S_5$, the switching transistor $S_6$, an equalizing capacitor $C_{o1}$, and an equalizing capacitor $C_{o2}$ form a half bridge rectifier circuit.

The T-type LCL resonant converter has the property of immittance network, a phase difference between the input voltage and the output current is 90°, and a phase difference between the output voltage and the input current is 90°, which can maintain UPF operations of the primary side and the secondary side, thereby reducing conduction loss. In addition, the secondary side of the T-type LCL resonant converter adopts a half bridge structure, which reduces the voltage stress of the switching transistors and the cost.

Specifically, the primary side full bridge includes the switching transistor $S_1$, the switching transistor $S_2$, the switching transistor $S_3$, and the switching transistor $S_4$, a body diode $D_1$, a body diode $D_2$, a body diode $D_3$, a body diode $D_4$, a parasitic capacitor $C_1$, a parasitic capacitor $C_2$, a parasitic capacitor $C_3$, and a parasitic capacitor $C_4$. The secondary side half bridge includes the switching transistor S$_5$, the switching transistor S$_6$, a parasitic capacitor C$_5$, and a parasitic capacitor C$_6$. Furthermore, i$_c$ represents a current of the resonant capacitor C.

In an embodiment, a soft switching modulation method for the T-type LCL resonant converter under the full power range. The soft switching modulation method includes the following steps:

step S01: in a cycle, adjusting pulse widths of the switching transistor S$_1$, the switching transistor S$_2$, the switching transistor S$_3$, and the switching transistor S$_4$ to obtain a high-frequency alternating voltage v$_{ab}$ of the primary side with a symmetrical waveform having three electrical levels, an amplitude equal to V$_{in}$, an adjustable positive pulse width, and an adjustable negative pulse width; in the cycle, adjusting pulse widths of the switching transistor S$_5$ and the switching transistor S$_6$ to obtain a high-frequency alternating voltage v$_{cd}$ of the secondary side with a square waveform having two electrical levels, an amplitude equal to 0.5 V$_{out}$, a constant positive pulse width equal to π, and a constant negative pulse width equal to π; V$_{in}$ represents an input voltage and V$_{out}$ represents an output voltage; and step S02: adjusting a current phase of a current i$_1$ of the resonant inductor L$_1$, thereby enabling the T-type LCL resonant converter to achieve soft switching operations of the switching transistor S$_1$, the switching transistor S$_2$, the switching transistor S$_3$, the switching transistor S$_4$, the switching transistor S$_5$, and the switching transistor S$_6$ under the full power range.

Figure 2:
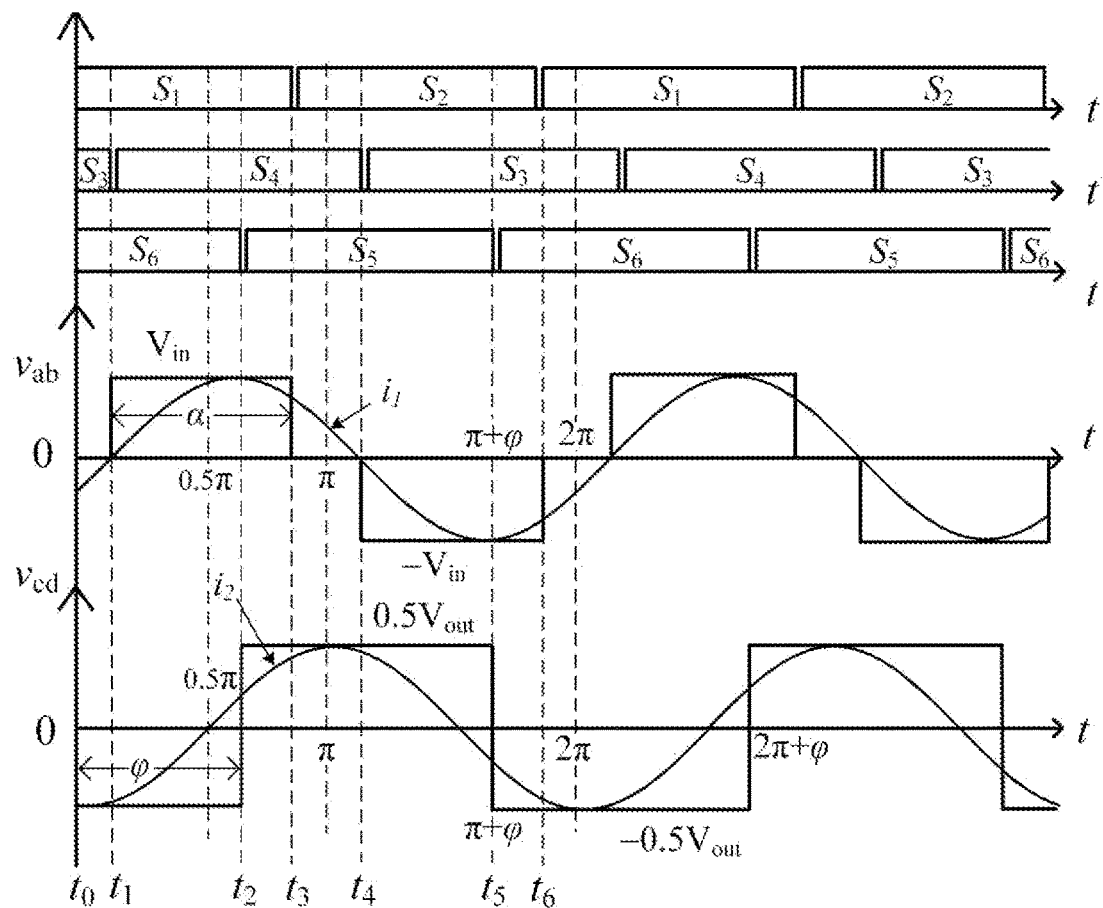
FIG. 2 illustrates a steady-state waveform diagram of the T-type LCL resonant converter using a soft switching modulation method under a full power range.
Figure 3:
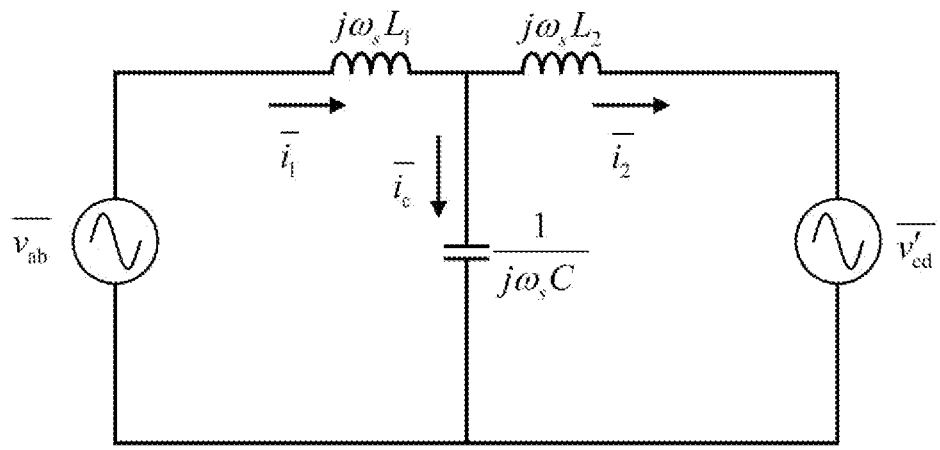
FIG. 3 illustrates an equivalent circuit diagram of the T-type LCL resonant converter in a phasor domain.

In an embodiment, in the step 01, as shown in FIG. 2, the adjusting pulse widths of the switching transistor S$_1$, the switching transistor S$_2$, the switching transistor S$_3$, and the switching transistor S$_4$ to obtain a high-frequency alternating voltage v$_{ab}$ of the primary side includes:

adjusting the pulse widths of the switching transistor S$_1$, the switching transistor S$_2$, the switching transistor S$_3$, and the switching transistor S$_4$ to achieve complementary conduction of the switching transistor S$_1$, the switching transistor S$_2$, the switching transistor S$_3$, and the switching transistor S$_4$ with a duty cycle of 50%, adjusting the switching transistor S$_4$ to lag the switching transistor S$_1$ by a target angle, thereby obtaining the high-frequency alternating voltage v$_{ab}$ of the primary side with the symmetrical waveform having the three electrical levels and the amplitude equal to V$_{in}$;

α(0<α<π) represents an angle that makes the switching transistor S$_1$ and the switching transistor S$_4$ be turned on simultaneously, and the adjustable positive pulse width and the adjustable negative pulse width are obtained by adjusting the angle α.

In an embodiment, the target angle is in a range of 0 to 180 degrees (i.e., 0<target angle<π).

In an embodiment, in the step S01, the adjusting pulse widths of the switching transistor S$_5$ and the switching transistor S$_6$ to obtain the high-frequency alternating voltage v$_{cd}$ of the secondary side includes: adjusting the pulse widths of the switching transistor S$_5$ and the switching transistor S$_6$ to achieve complementary conduction of the switching transistor S$_5$ and the switching transistor S$_6$ with a duty cycle of 50%, and adjusting a fundamental wave of the square waveform to lag a fundamental wave of the symmetrical waveform by a phase angle φ, thereby obtaining the square waveform having the two electrical levels and the amplitude equal to 0.5 V$_{out}$.

In an embodiment, in the step 02, the current phase of the current it of the resonant inductor L$_1$ to is adjusted to (π−α)/2, thereby enabling the T-type LCL resonant converter to achieve soft switching operations of the switching transistor S$_1$, the switching transistor S$_2$, the switching transistor S$_3$, the switching transistor S$_4$, the switching transistor S$_5$, and the switching transistor S$_6$ under the full power range.

In an embodiment, the current i$_1$ of the resonant inductor L$_1$ and a current i$_2$ of the resonant inductor L$_2$ are calculated by:

based on an equivalent circuit of the T-type LCL resonant converter in a phasor domain, and using Kirchhoff's current law (KCL) and Kirchhoff's voltage law (KVL) to obtain two expressions:

$$\overline{v_{ab}} = j\left(\omega_s L_1 - \frac{1}{\omega_s C}\right)\overline{i_1} + \frac{j}{\omega_s C}\overline{i_2}$$

$$\overline{v'_{cd}} = j\left(\frac{1}{\omega_s C} - \omega_s L_2\right)\overline{i_2} - \frac{j}{\omega_s C}\overline{i_1}$$

where $\overline{v_{ab}}$ represents a phasor expression of v$_{ab}$, $\overline{v'_{cd}}$ represents a phasor expression of v$_{cd}$ converted to the primary side, $\overline{i_1}$ represents a phasor expression of the current i$_1$ of the resonant inductor L$_1$, $\overline{i_2}$ represents a phasor expression of the current i$_2$ of the resonant inductor L$_2$, ω$_s$ represents a switching angular frequency, and C represents a resonant capacitance;

when the T-type LCL resonant converter operates in a resonant operation mode, the switching angular frequency ω$_s$ is equal to a resonant angular frequency ω$_r$, and the following formula is obtained:

$$\omega_s = \omega_r = \sqrt{\frac{C}{L_r}};$$

in the formula, L$_r$=L$_1$=L$_2$, simplifying the two expressions as:

$$\overline{v_{ab}} = \frac{j}{\omega_s C}\overline{i_2}$$

$$\overline{v'_{cd}} = -\frac{j}{\omega_s C}\overline{i_1}$$

Figure 4:
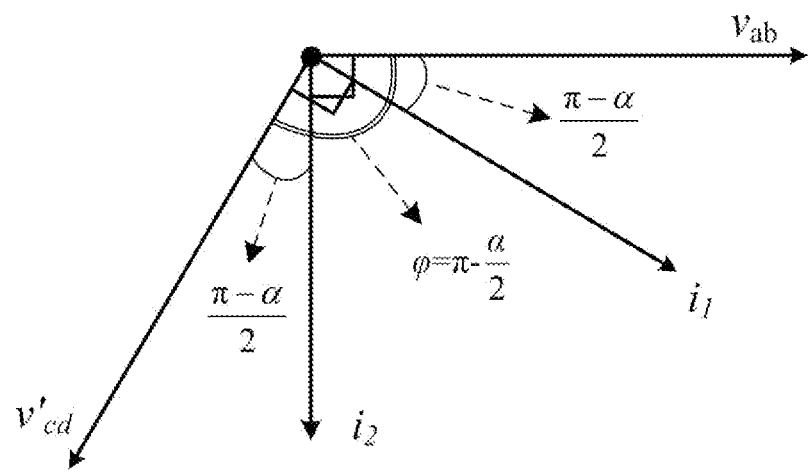
FIG. 4 illustrates a phase diagram of a current and a voltage of a resonant inductor of the T-type LCL resonant converter.
Figure 5A:
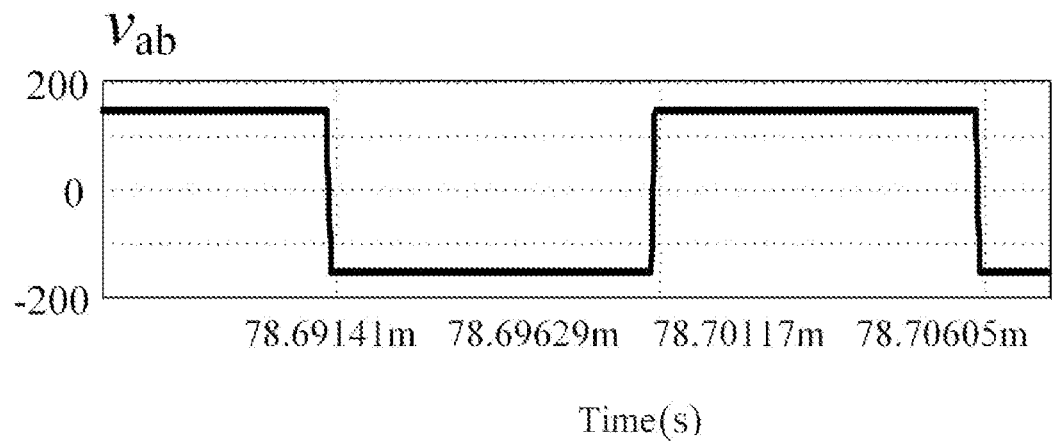
FIG. 5a illustrates a waveform diagram of $v_{ab}$ when $V_{in}$=150 V, $V_{out}$=75 V, M=1, and $P_o$=200 W.
Figure 5B:
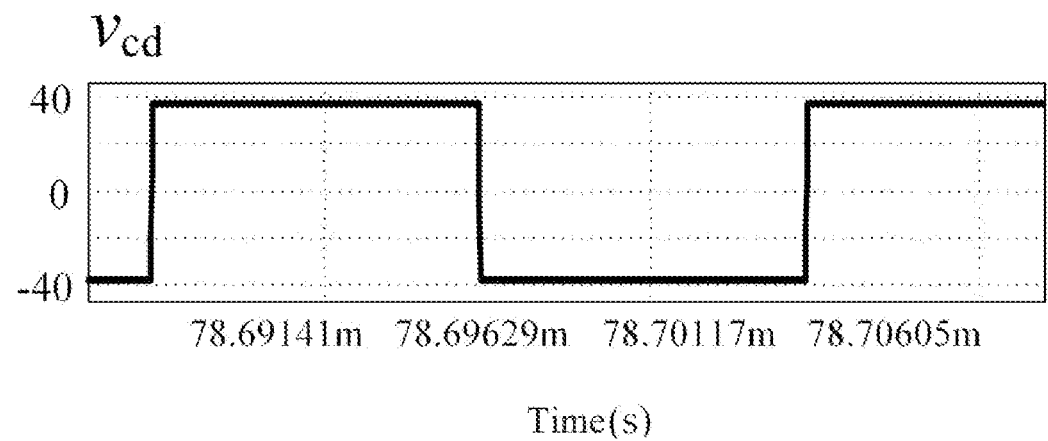
FIG. 5b illustrates a waveform diagram of $v_{cd}$ when $V_{in}$=150 V, $V_{out}$=75 V, M=1, and $P_o$=200 W.
Figure 5C:
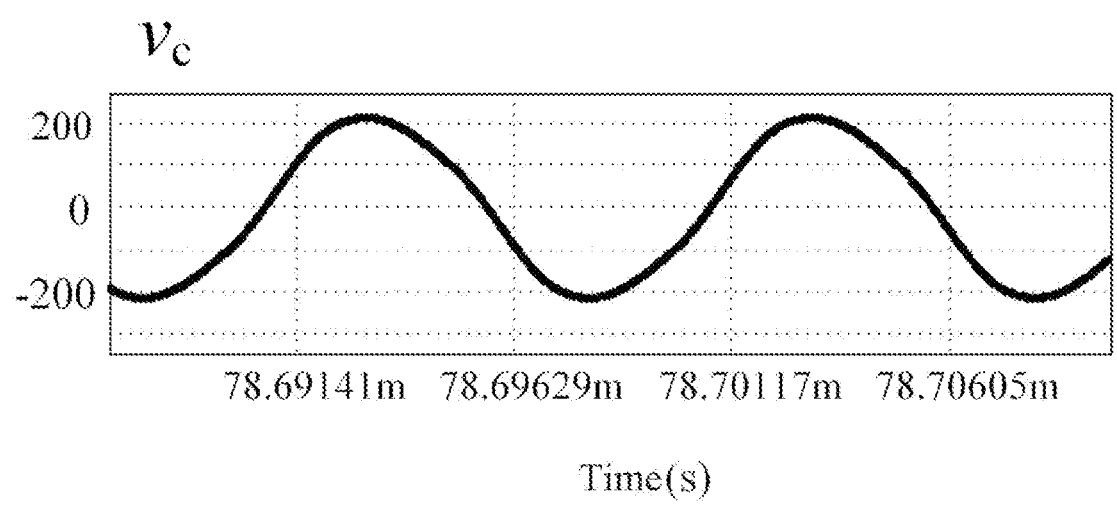
FIG. 5c illustrates a waveform diagram of $v_c$ when $V_{in}$=150 V, $V_{out}$=75 V, M=1, and $P_o$=200 W.
Figure 5D:
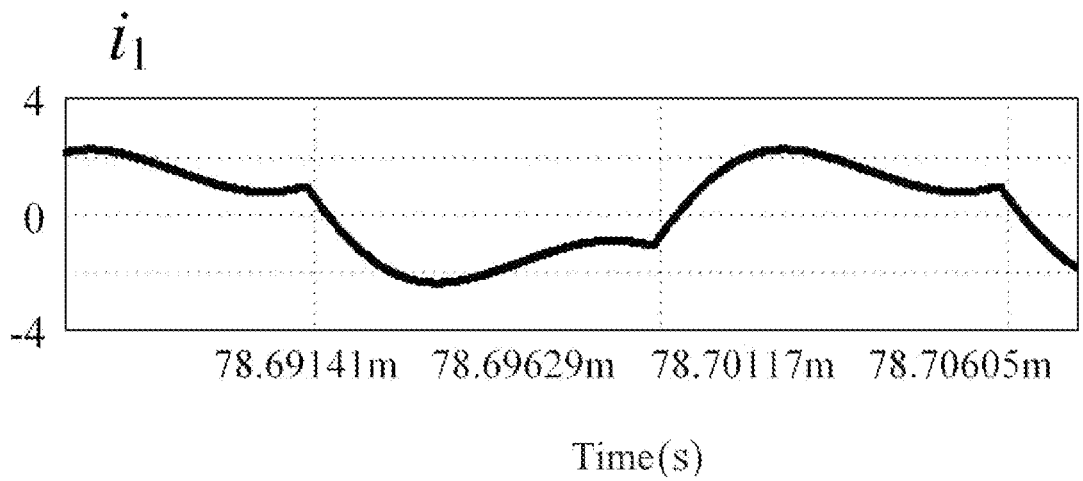
FIG. 5d illustrates a waveform diagram of $i_1$ when $V_{in}$=150 V, $V_{out}$=75 V, M=1, and $P_o$=200 W.
Figure 5E:
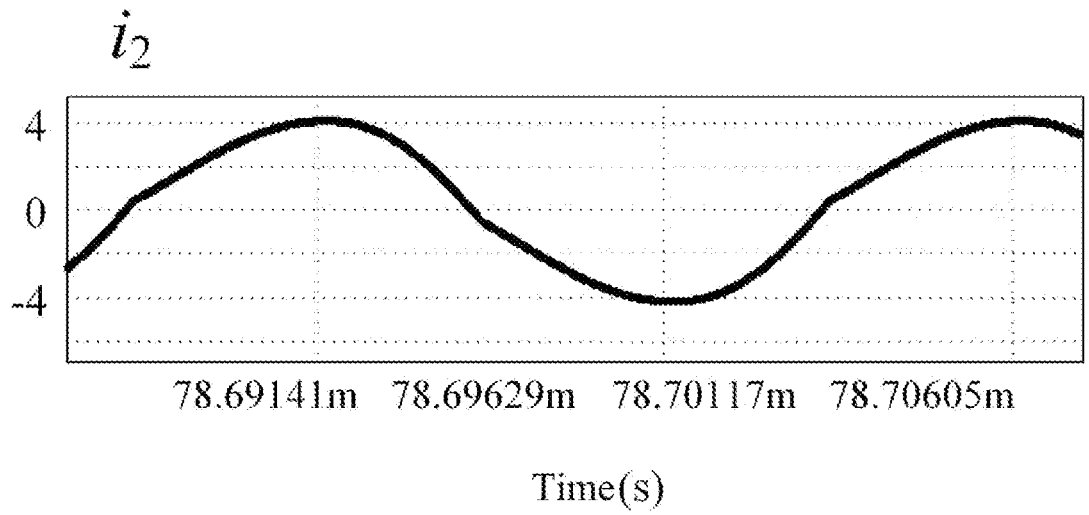
FIG. 5e illustrates a waveform diagram of $i_2$ when $V_{in}$=150 V, $V_{out}$=75 V, M=1, and $P_o$=200 W.
Figure 5F:
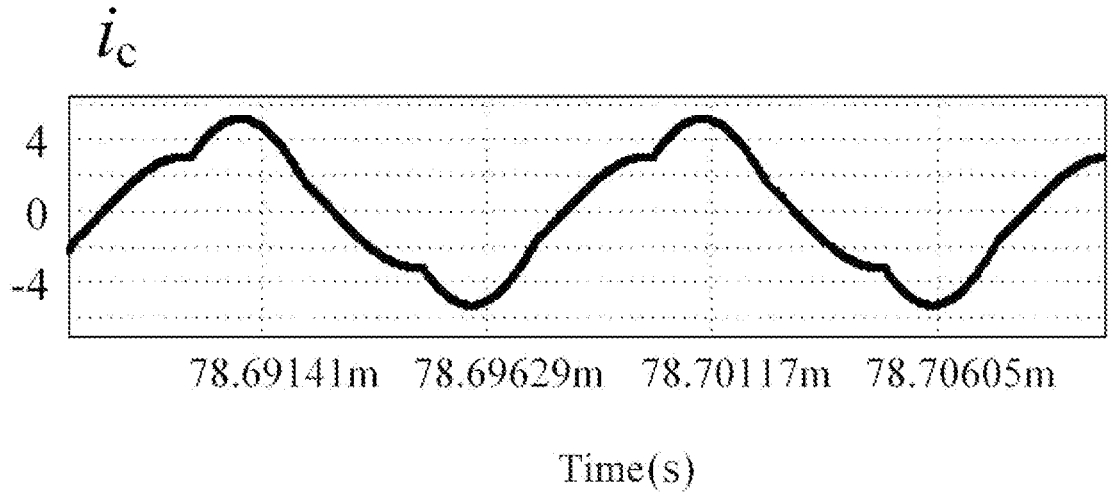
FIG. 5f illustrates a waveform diagram of $i_c$ when $V_{in}$=150 V, $V_{out}$=75 V, M=1, and $P_o$=200 W.
Figure 5G:
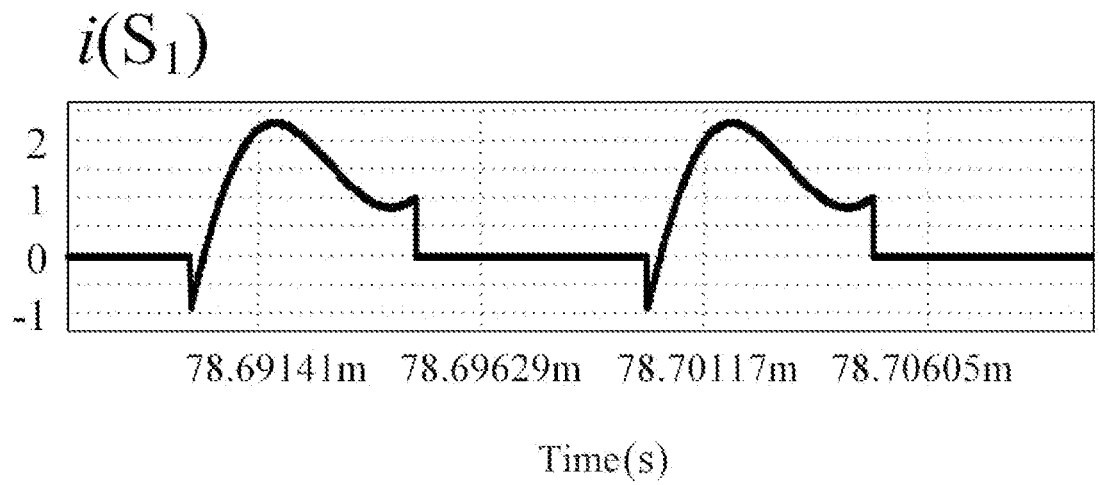
FIG. 5g illustrates a waveform diagram of $S_1$ when $V_{in}$=150 V, $V_{out}$=75 V, M=1, and $P_o$=200 W.
Figure 5H:
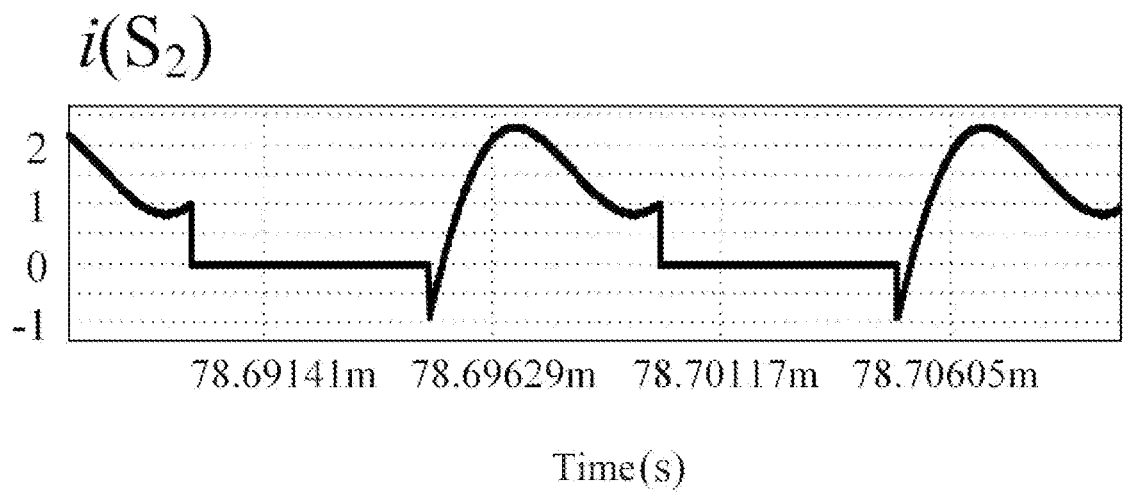
FIG. 5h illustrates a waveform diagram of $S_2$ when $V_{in}$=150 V, $V_{out}$=75 V, M=1, and $P_o$=200 W.
Figure 5I:
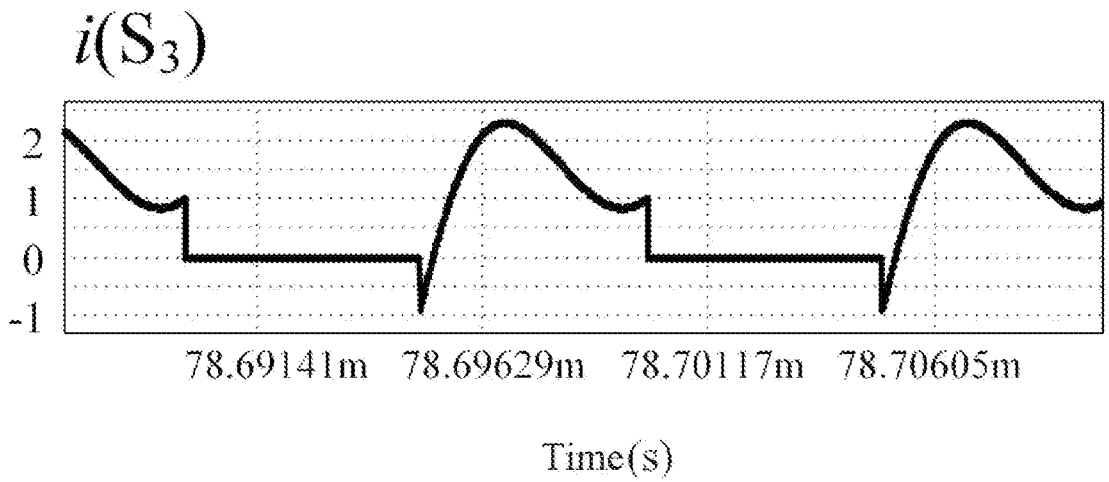
FIG. 5i illustrates a waveform diagram of $S_3$ when $V_{in}$=150 V, $V_{out}$=75 V, M=1, and $P_o$=200 W.
Figure 5J:
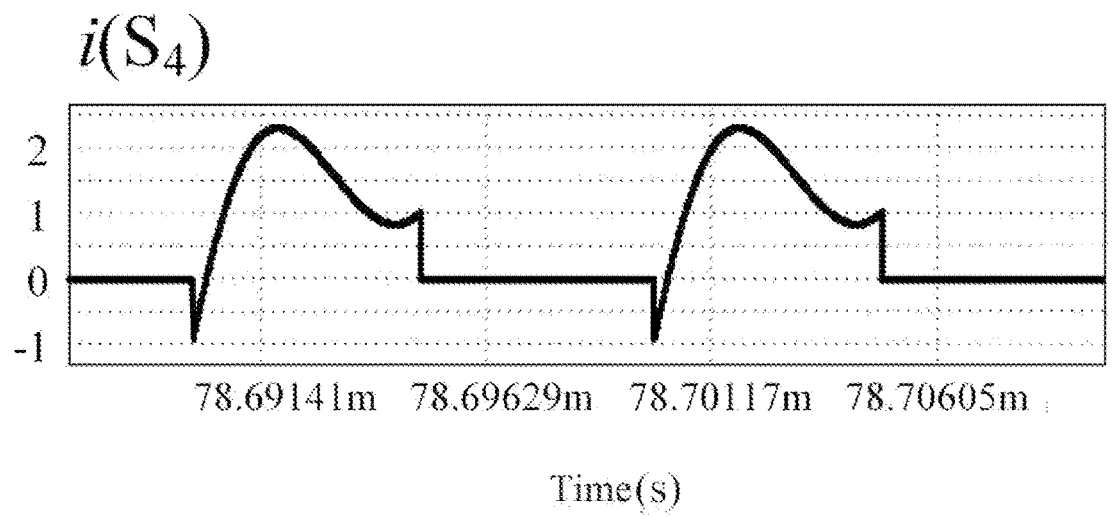
FIG. 5j illustrates a waveform diagram of $S_4$ when $V_{in}$=150 V, $V_{out}$=75 V, M=1, and $P_o$=200 W.
Figure 5K:
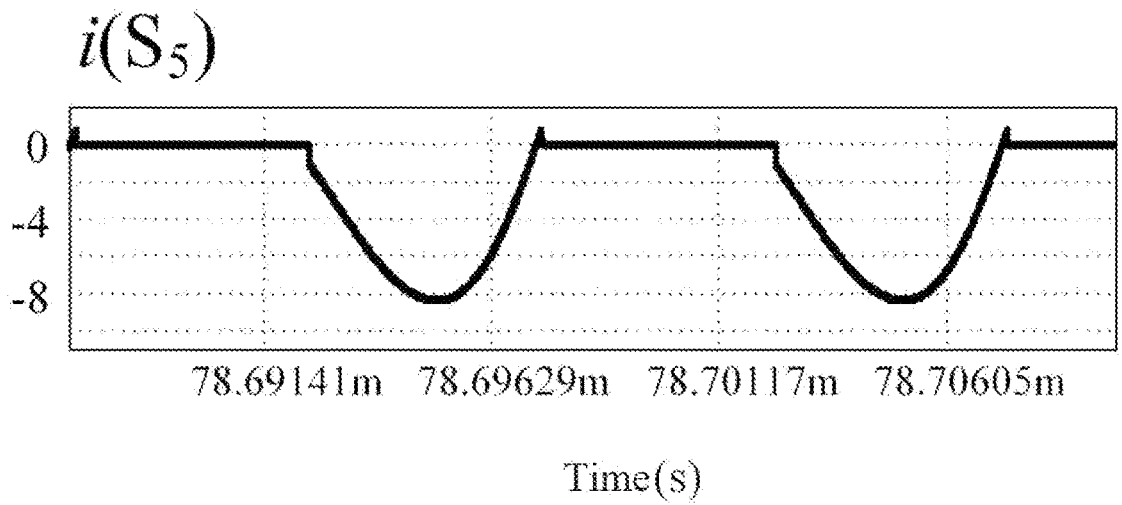
FIG. 5k illustrates a waveform diagram of $S_5$ when $V_{in}$=150 V, $V_{out}$=75 V, M=1, and $P_o$=200 W.
Figure 5L:
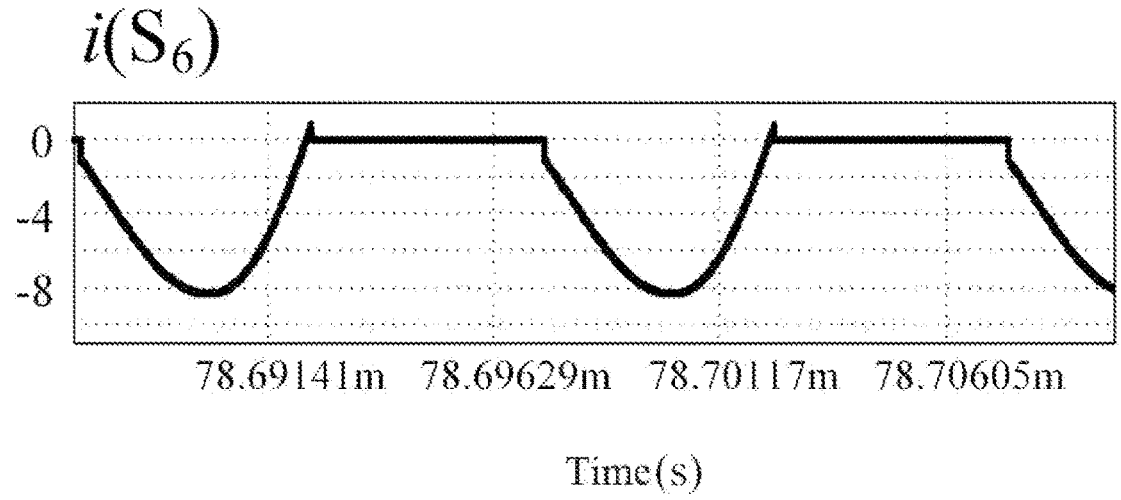
FIG. 5l illustrates a waveform diagram of $S_6$ when $V_{in}$=150 V, $V_{out}$=75 V, M=1, and $P_o$=200 W.
Figure 6A:
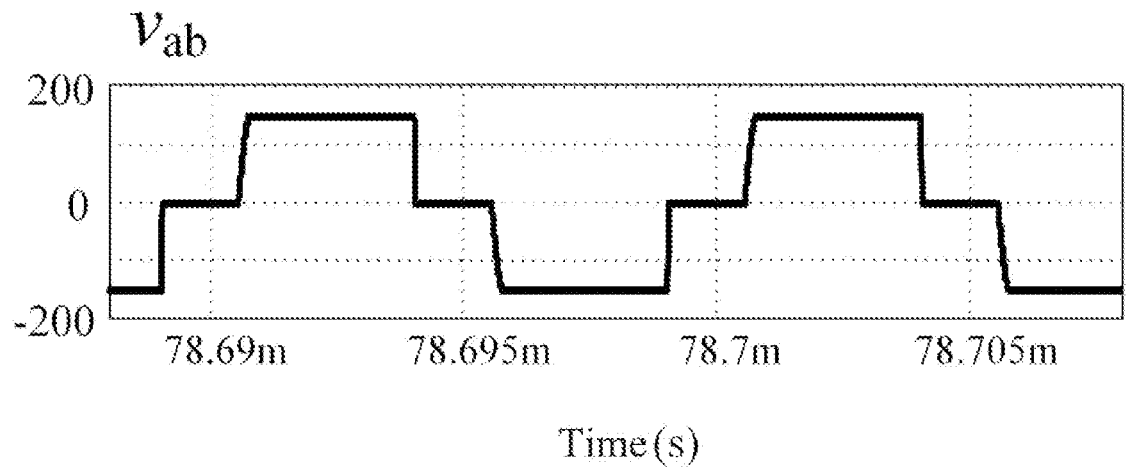
FIG. 6a illustrates a waveform diagram of $v_{ab}$ when $V_{in}$=150 V, $V_{out}$=75 V, M=1, and $P_o$=150 W.
Figure 6B:
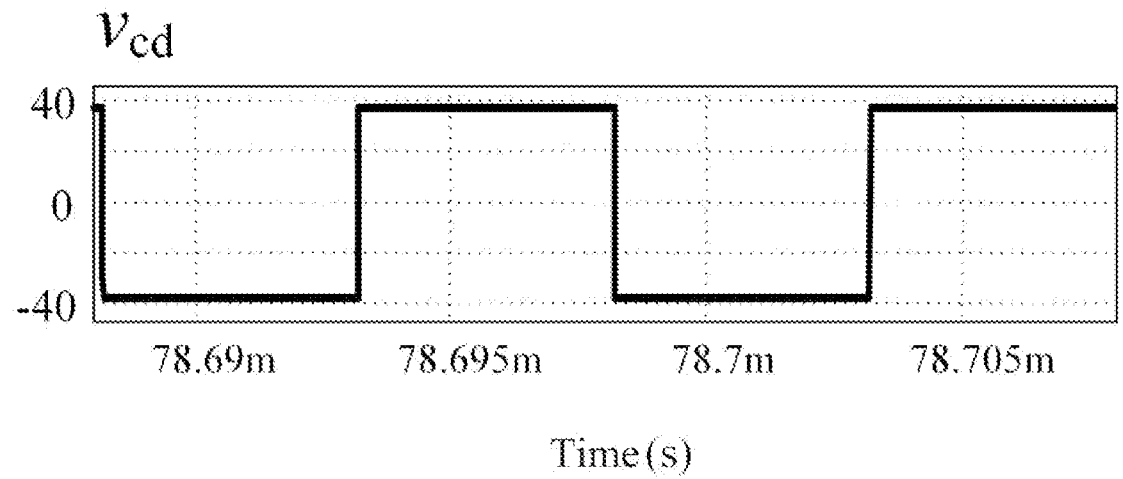
FIG. 6b illustrates a waveform diagram of $v_{cd}$ when $V_{in}$=150 V, $V_{out}$=75 V, M=1, and $P_o$=150 W.
Figure 6C:
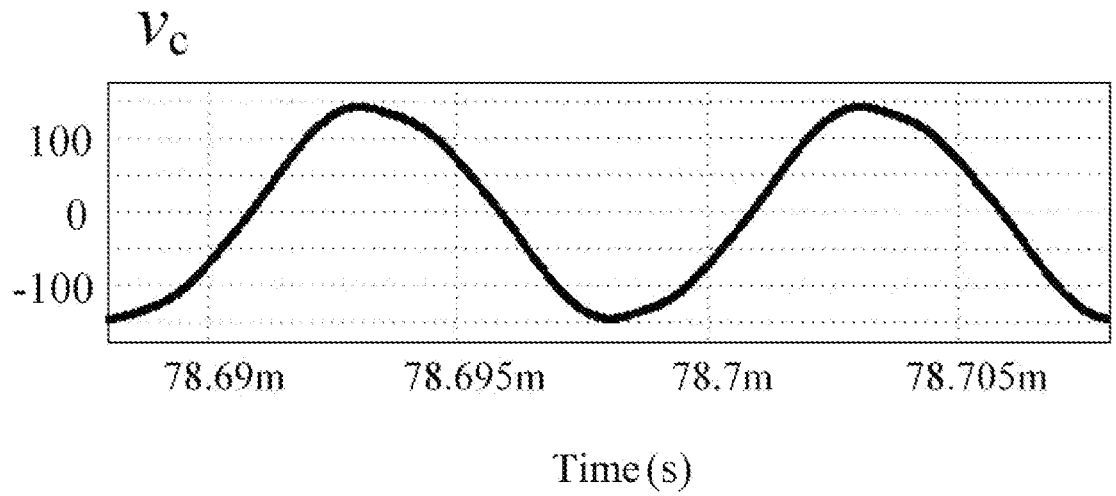
FIG. 6c illustrates a waveform diagram of $v_c$ when $V_{in}$=150 V, $V_{out}$=75 V, M=1, and $P_o$=150 W.
Figure 6D:
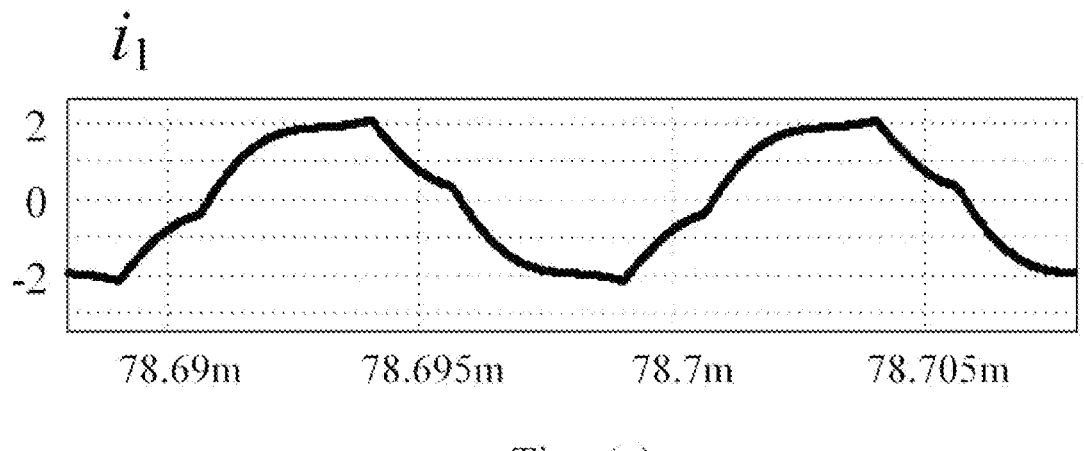
FIG. 6d illustrates a waveform diagram of $i_1$ when $V_{in}$=150 V, $V_{out}$=75 V, M=1, and $P_o$=150 W.
Figure 6E:
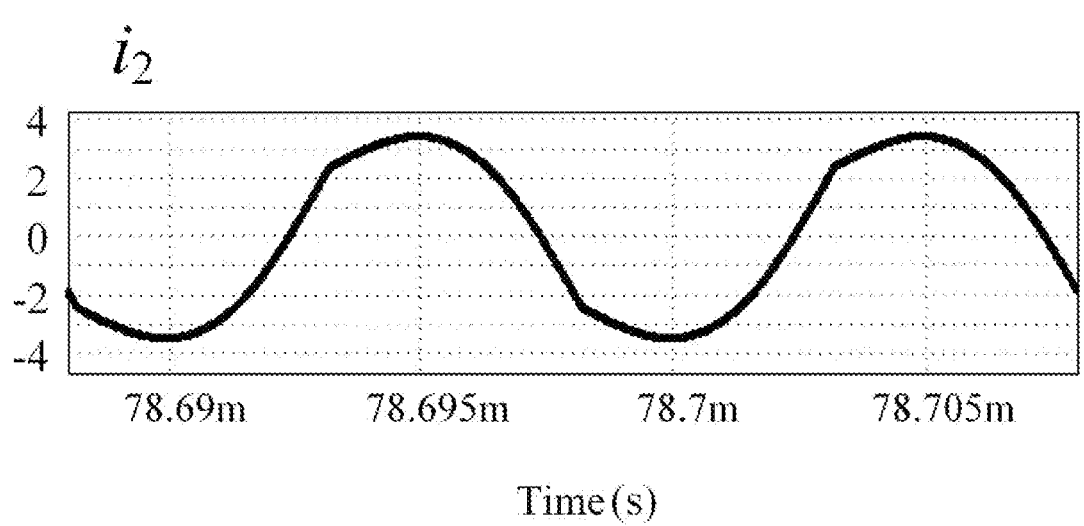
FIG. 6e illustrates a waveform diagram of $i_2$ when $V_{in}$=150 V, $V_{out}$=75 V, M=1, and $P_o$=150 W.
Figure 6F:
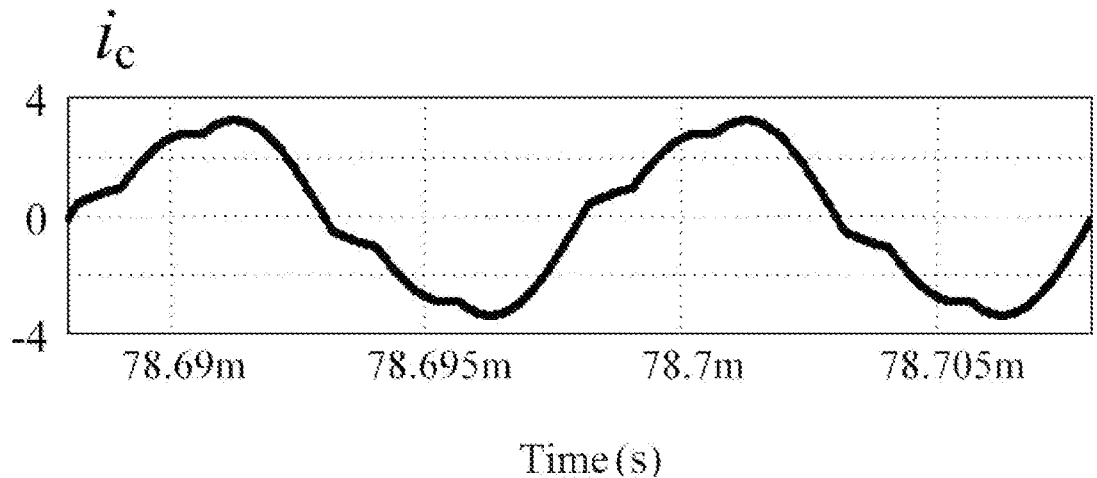
FIG. 6f illustrates a waveform diagram of $i_c$ when $V_{in}$=150 V, $V_{out}$=75 V, M=1, and $P_o$=150 W.
Figure 6G:
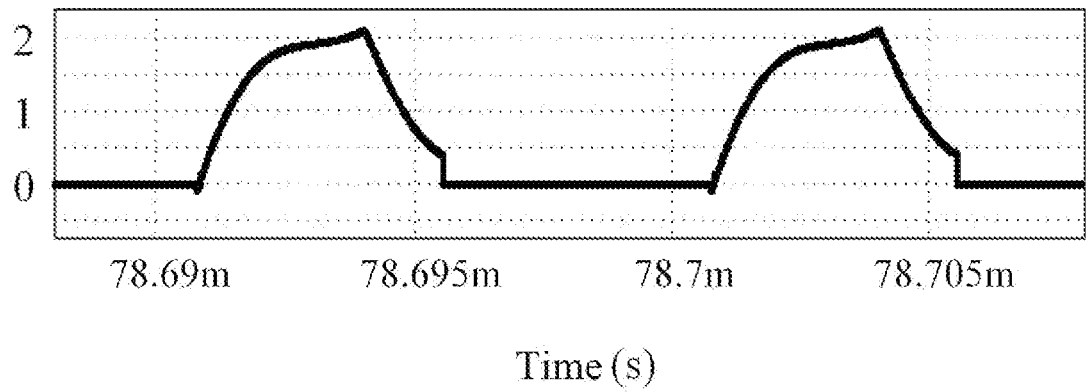
FIG. 6g illustrates a waveform diagram of $S_1$ when $V_{in}$=150 V, $V_{out}$=75 V, M=1, and $P_o$=150 W.
Figure 6H:
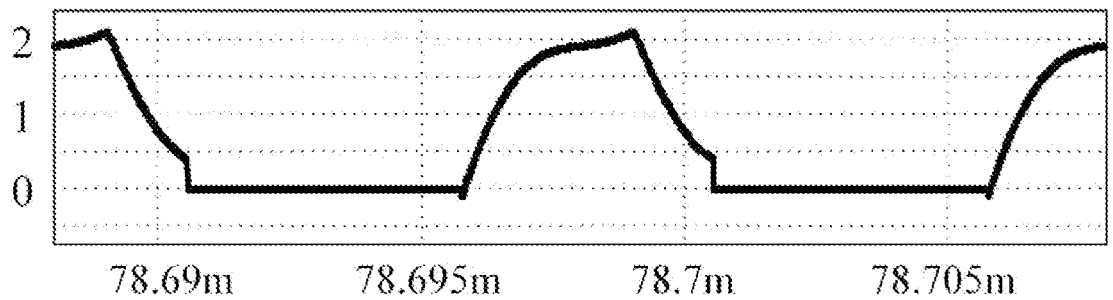
FIG. 6h illustrates a waveform diagram of $S_2$ when $V_{in}$=150 V, $V_{out}$=75 V, M=1, and $P_o$=150 W.
Figure 6I:
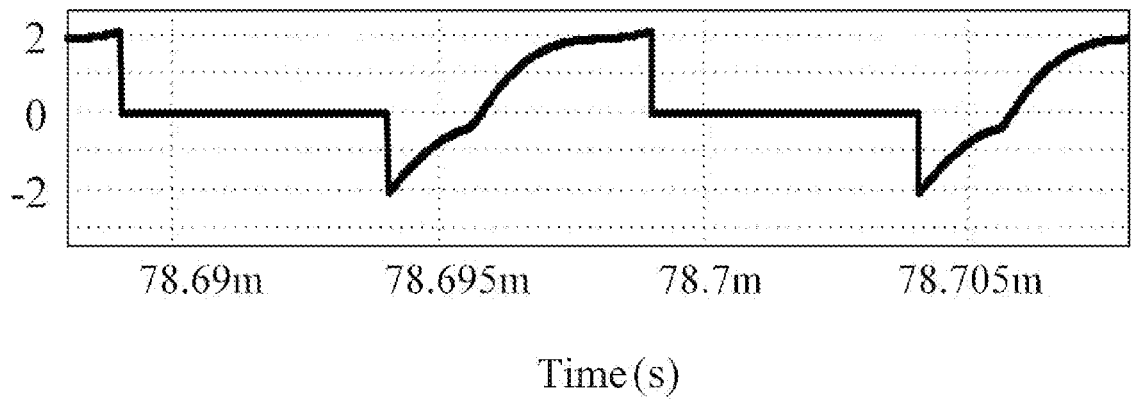
FIG. 6*i* illustrates a waveform diagram of $S_3$ when $V_{in}$=150 V, $V_{out}$=75 V, M=1, and $P_o$=150 W.
Figure 6J:
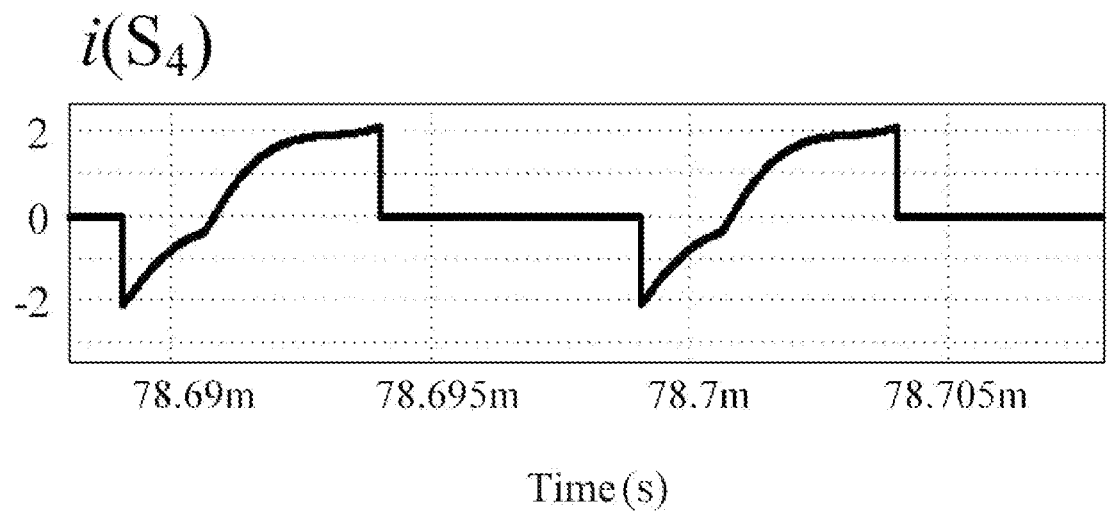
FIG. 6*j* illustrates a waveform diagram of $S_4$ when $V_{in}$=150 V, $V_{out}$=75 V, M=1, and $P_o$=150 W.
Figure 6K:
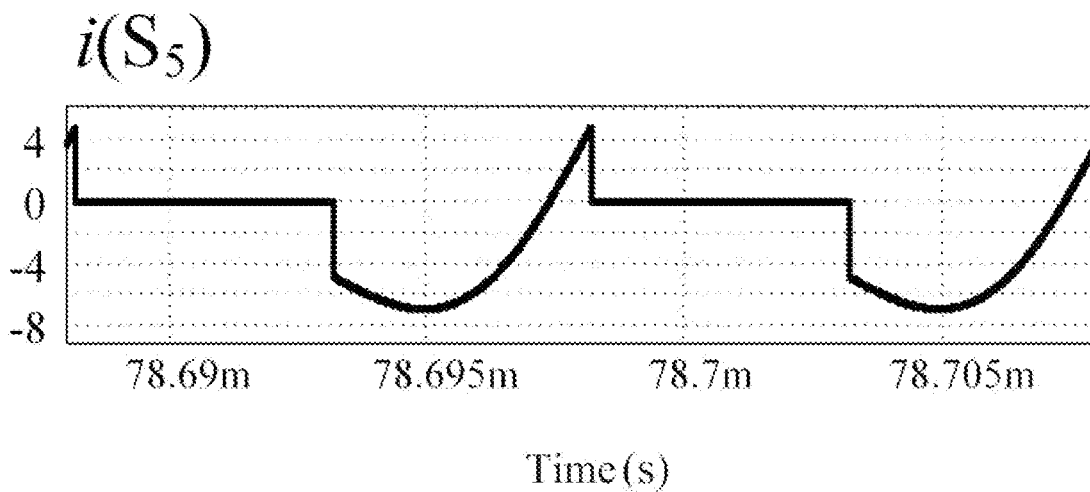
FIG. 6*k* illustrates a waveform diagram of $S_5$ when $V_{in}$=150 V, $V_{out}$=75 V, M=1, and $P_o$=150 W.
Figure 6L:
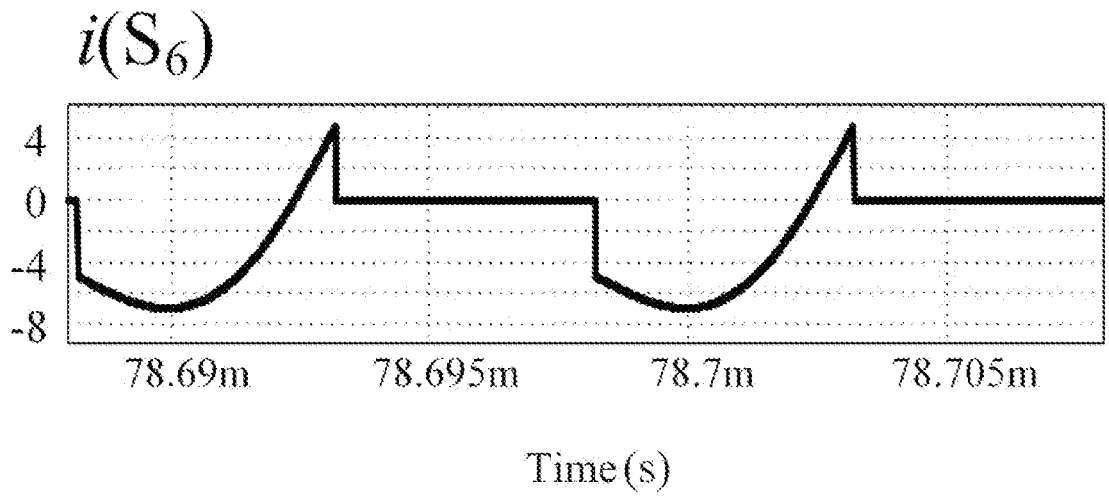
FIG. 6*l* illustrates a waveform diagram of $S_6$ when $V_{in}$=150 V, $V_{out}$=75 V, M=1, and $P_o$=150 W.
Figure 7A:
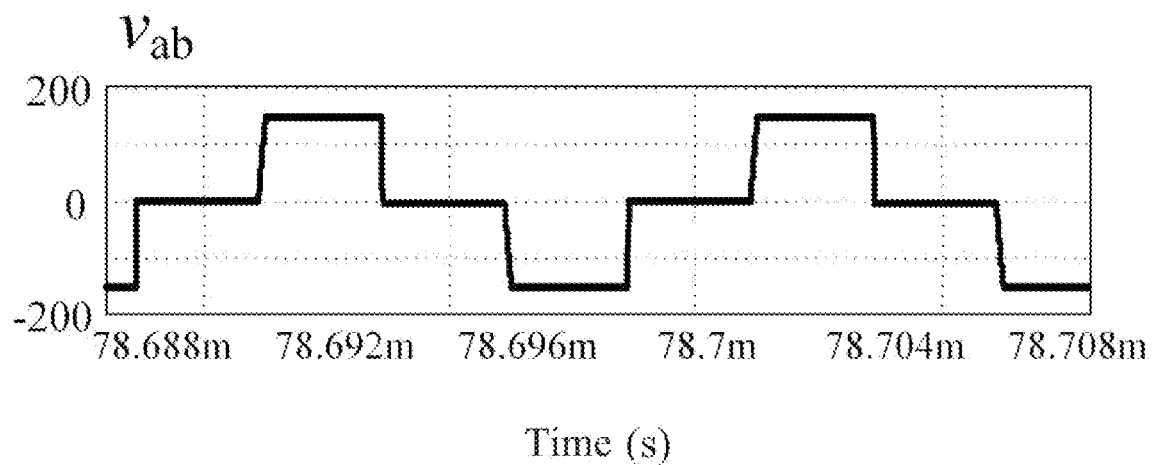
FIG. 7*a* illustrates a waveform diagram of $v_{ab}$ when $V_{in}$=150 V, $V_{out}$=75 V, M=1, and $P_o$=100 W.
Figure 7B:
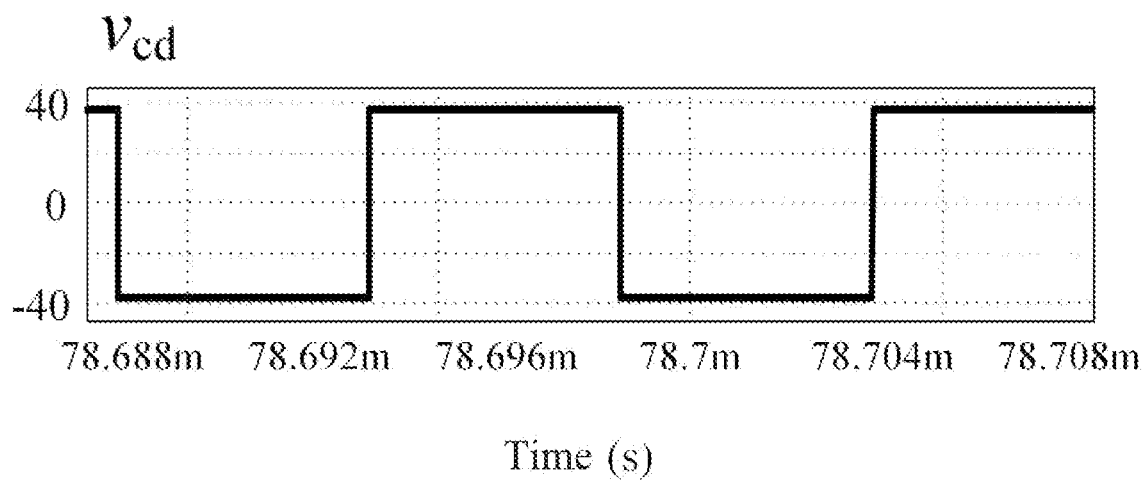
FIG. 7*b* illustrates a waveform diagram of $v_{cd}$ when $V_{in}$=150 V, $V_{out}$=75 V, M=1, and $P_o$=100 W.
Figure 7C:
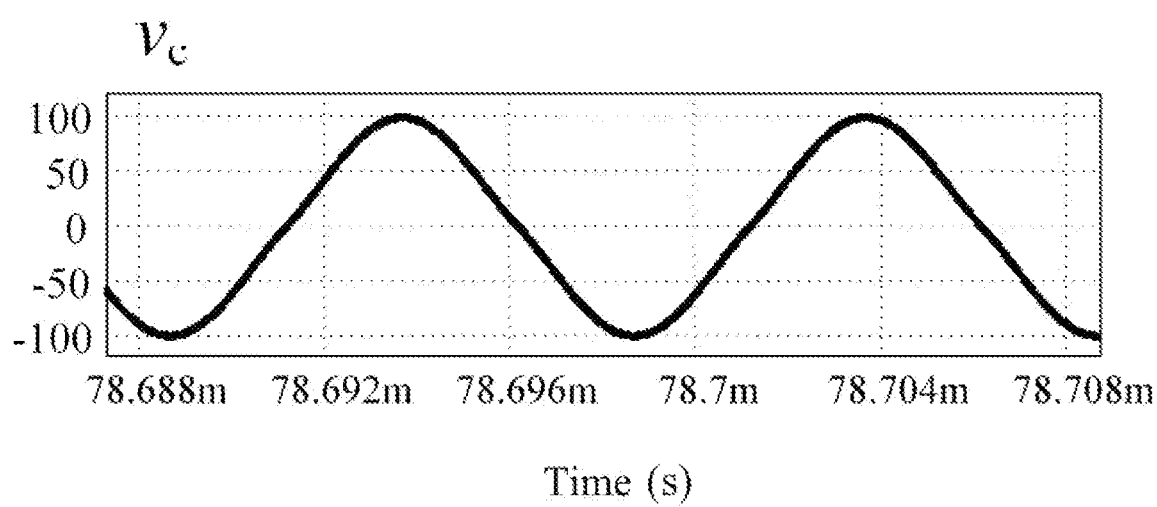
FIG. 7*c* illustrates a waveform diagram of $v_c$ when $V_{in}$=150 V, $V_{out}$=75 V, M=1, and $P_o$=100 W.
Figure 7D:
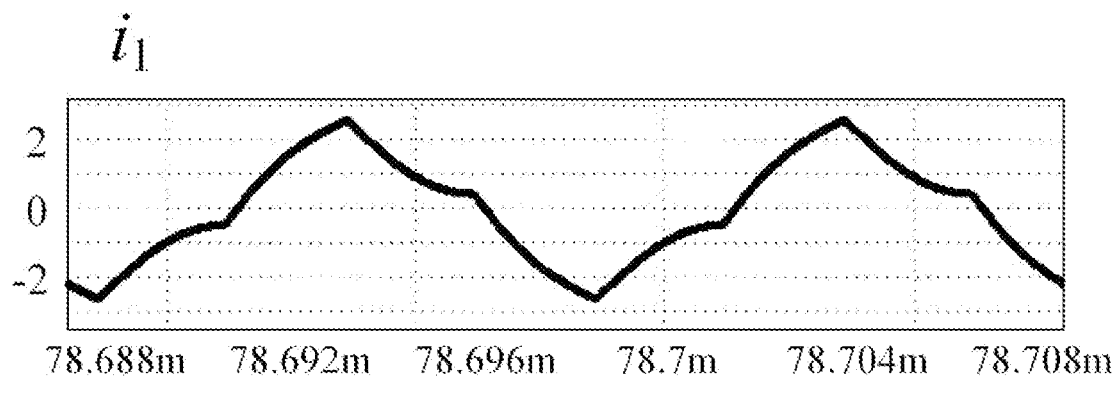
FIG. 7*d* illustrates a waveform diagram of $i_1$ when $V_{in}$=150 V, $V_{out}$=75 V, M=1, and $P_o$=100 W.
Figure 7E:
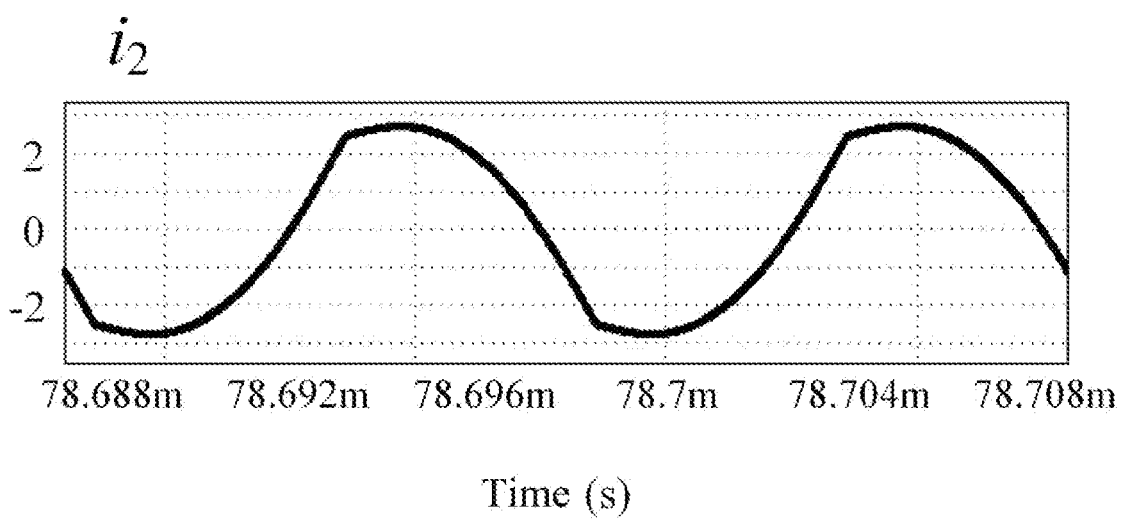
FIG. 7*e* illustrates a waveform diagram of $i_2$ when $V_{in}$=150 V, $V_{out}$=75 V, M=1, and $P_o$=100 W.
Figure 7F:
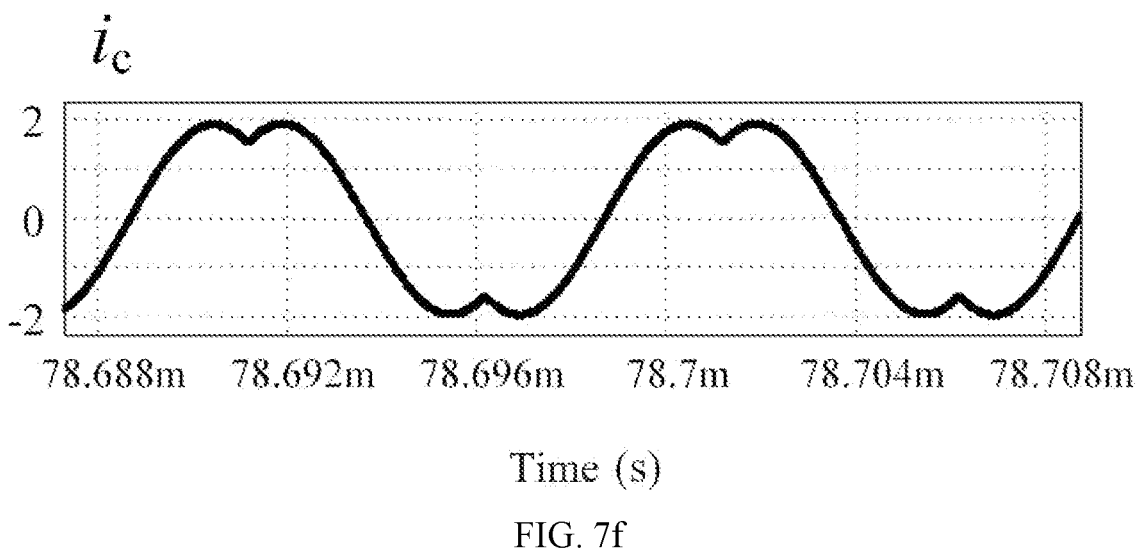
FIG. 7*f* illustrates a waveform diagram of $i_c$ when $V_{in}$=150 V, $V_{out}$=75 V, M=1, and $P_o$=100 W.
Figure 7G:
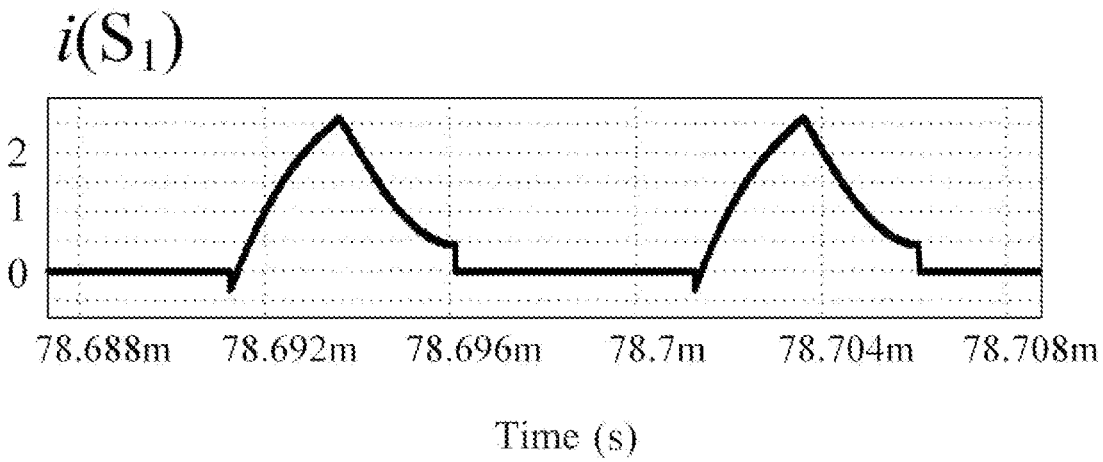
FIG. 7*g* illustrates a waveform diagram of $S_1$ when $V_{in}$=150 V, $V_{out}$=75 V, M=1, and $P_o$=100 W.
Figure 7H:
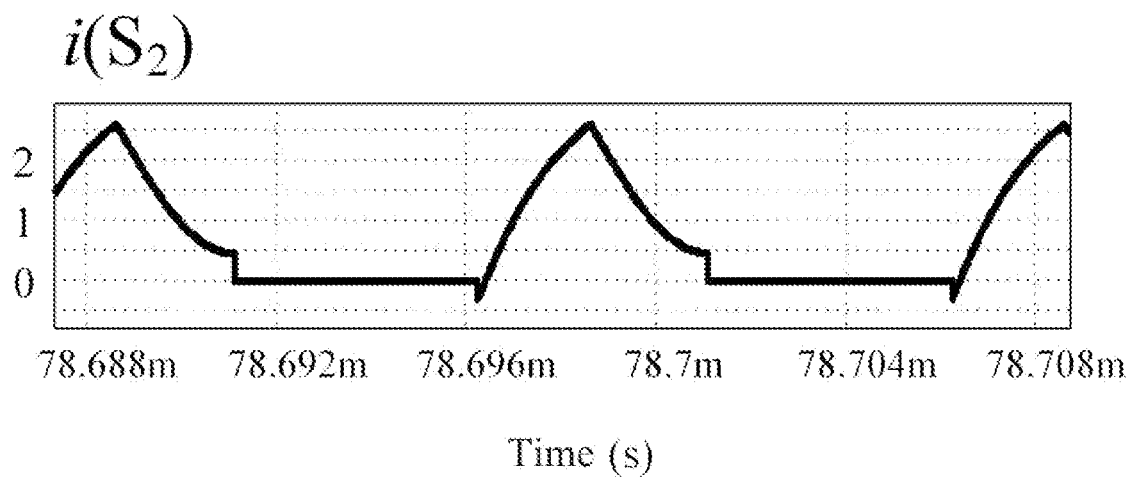
FIG. 7*h* illustrates a waveform diagram of $S_2$ when $V_{in}$=150 V, $V_{out}$=75 V, M=1, and $P_o$=100 W.
Figure 7I:
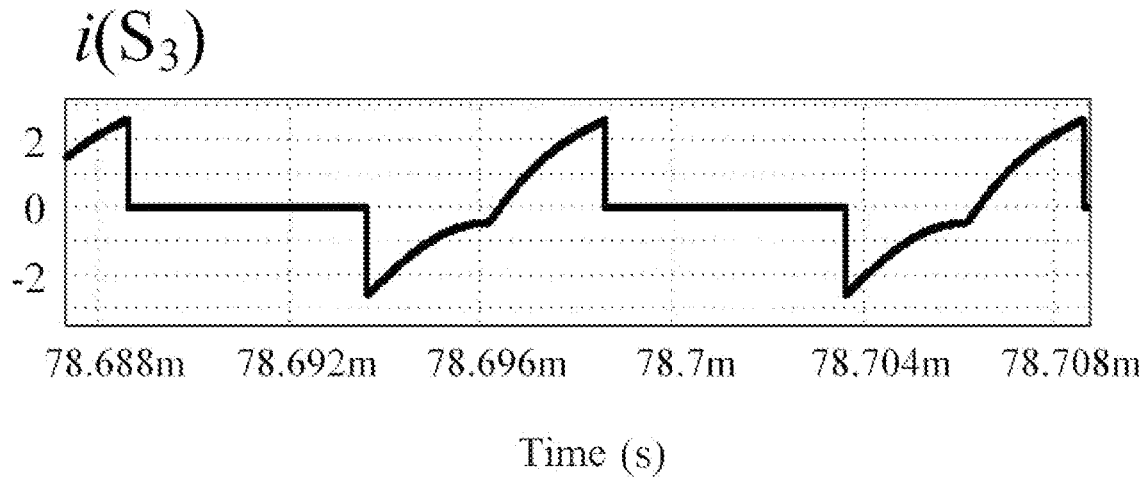
FIG. 7*i* illustrates a waveform diagram of $S_3$ when $V_{in}$=150 V, $V_{out}$=75 V, M=1, and $P_o$=100 W.
Figure 7J:
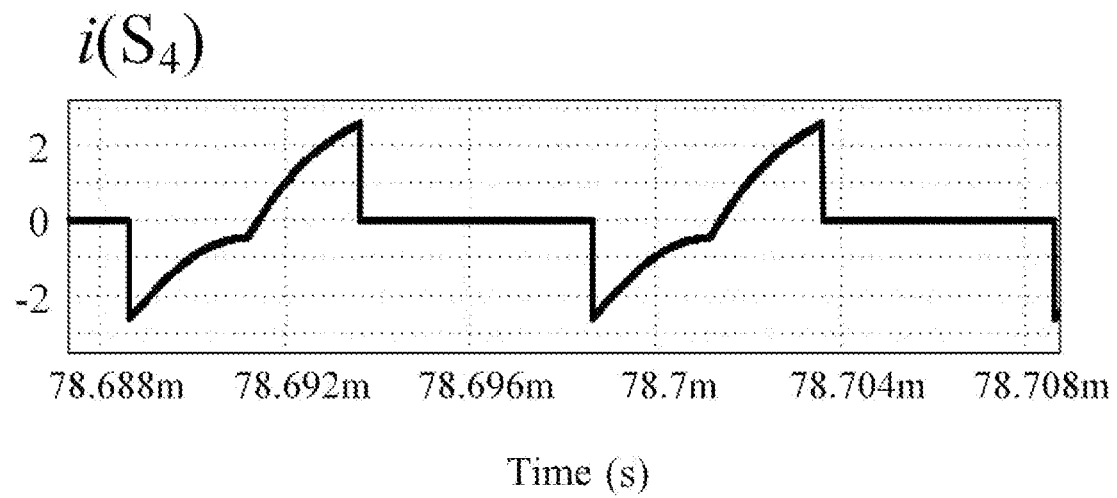
FIG. 7*j* illustrates a waveform diagram of $S_4$ when $V_{in}$=150 V, $V_{out}$=75 V, M=1, and $P_o$=100 W.
Figure 7K:
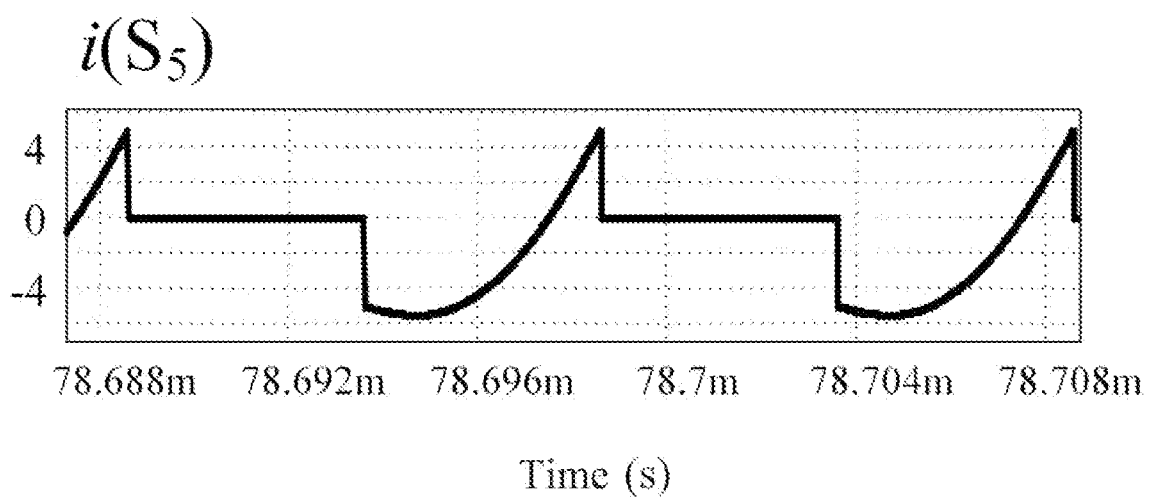
FIG. 7*k* illustrates a waveform diagram of $S_5$ when $V_{in}$=150 V, $V_{out}$=75 V, M=1, and $P_o$=100 W.
Figure 7L:
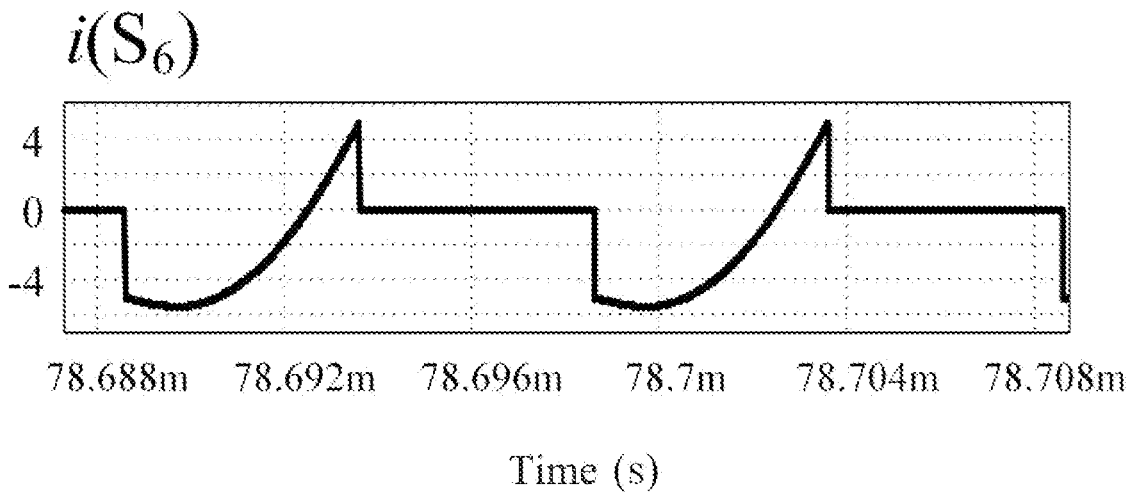
FIG. 7*l* illustrates a waveform diagram of $S_6$ when $V_{in}$=150 V, $V_{out}$=75 V, M=1, and $P_o$=100 W.
Figure 8A:
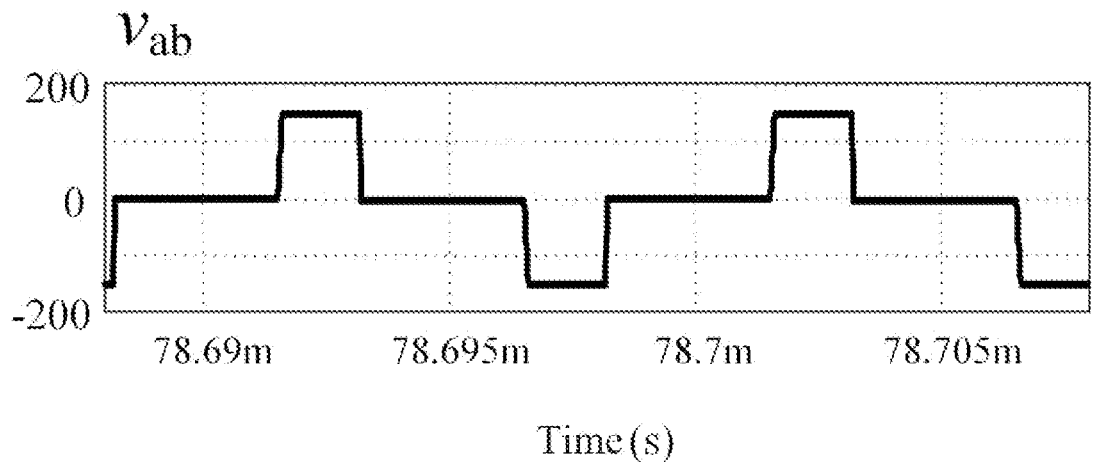
FIG. 8*a* illustrates a waveform diagram of $v_{ab}$ when $V_{in}$=150 V, $V_{out}$=75 V, M=1, and $P_o$=50 W.
Figure 8B:
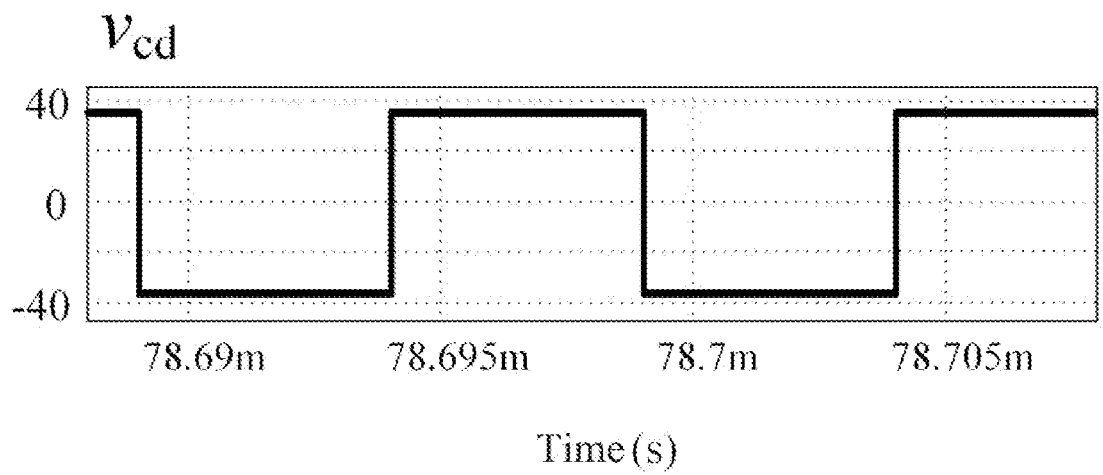
FIG. 8*b* illustrates a waveform diagram of $v_{cd}$ when $V_{in}$=150 V, $V_{out}$=75 V, M=1, and $P_o$=50 W.
Figure 8C:
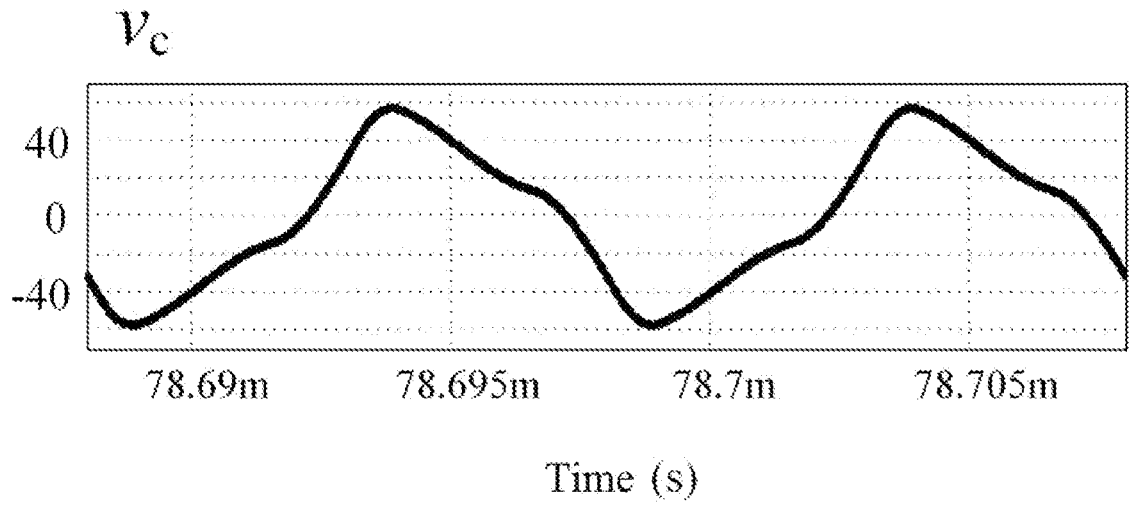
FIG. 8*c* illustrates a waveform diagram of $v_c$ when $V_{in}$=150 V, $V_{out}$=75 V, M=1, and $P_o$=50 W.
Figure 8D:
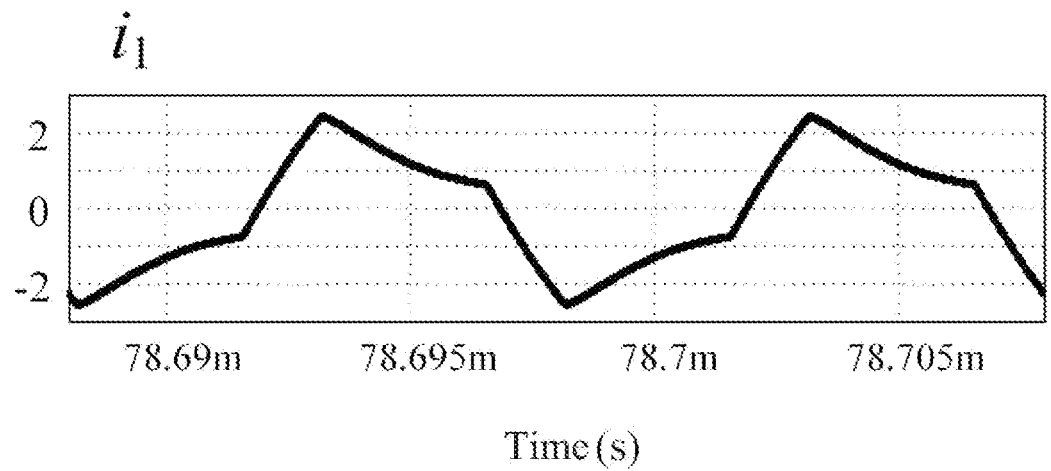
FIG. 8*d* illustrates a waveform diagram of $i_1$ when $V_{in}$=150 V, $V_{out}$=75 V, M=1, and $P_o$=50 W.
Figure 8E:
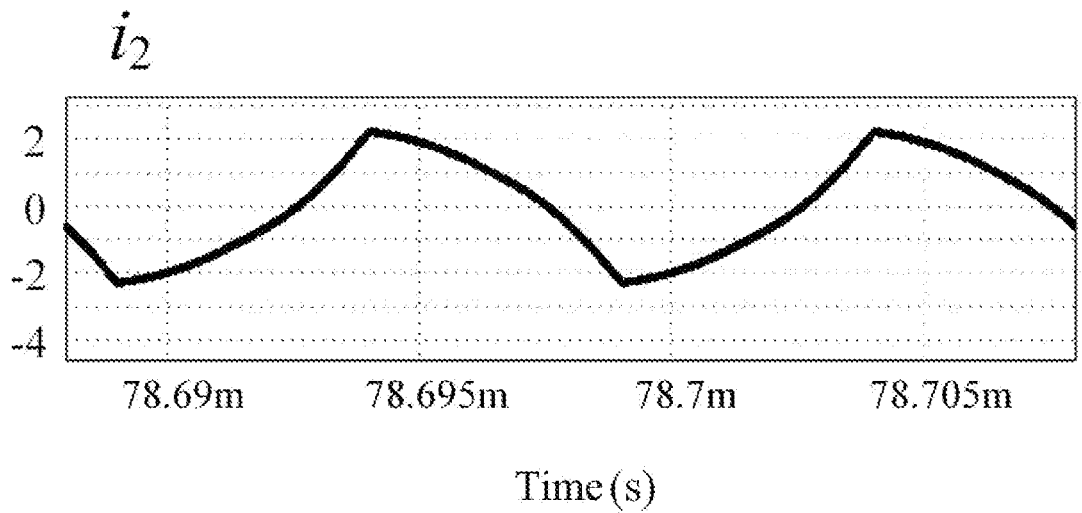
FIG. 8*e* illustrates a waveform diagram of $i_2$ when $V_{in}$=150 V, $V_{out}$=75 V, M=1, and $P_o$=50 W.
Figure 8F:
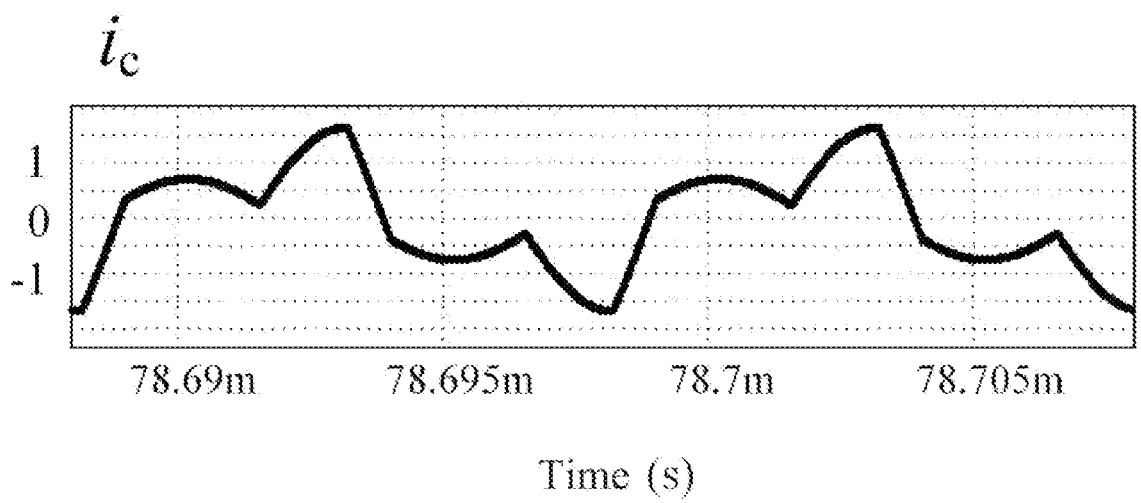
FIG. 8*f* illustrates a waveform diagram of $i_c$ when $V_{in}$=150 V, $V_{out}$=75 V, M=1, and $P_o$=50 W.
Figure 8G:
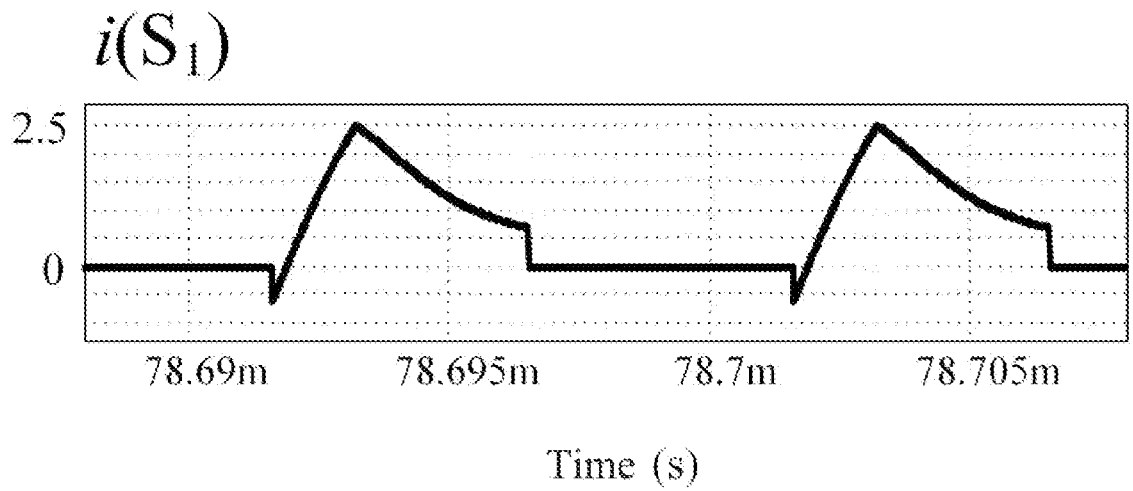
FIG. 8*g* illustrates a waveform diagram of $S_1$ when $V_{in}$=150 V, $V_{out}$=75 V, M=1, and $P_o$=50 W.
Figure 8H:
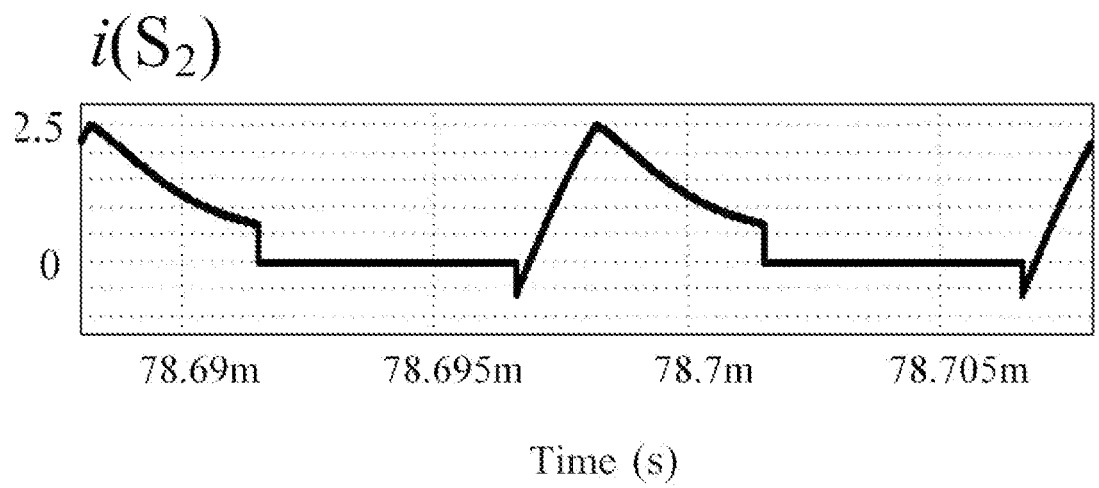
FIG. 8*h* illustrates a waveform diagram of $S_2$ when $V_{in}$=150 V, $V_{out}$=75 V, M=1, and $P_o$=50 W.
Figure 8I:
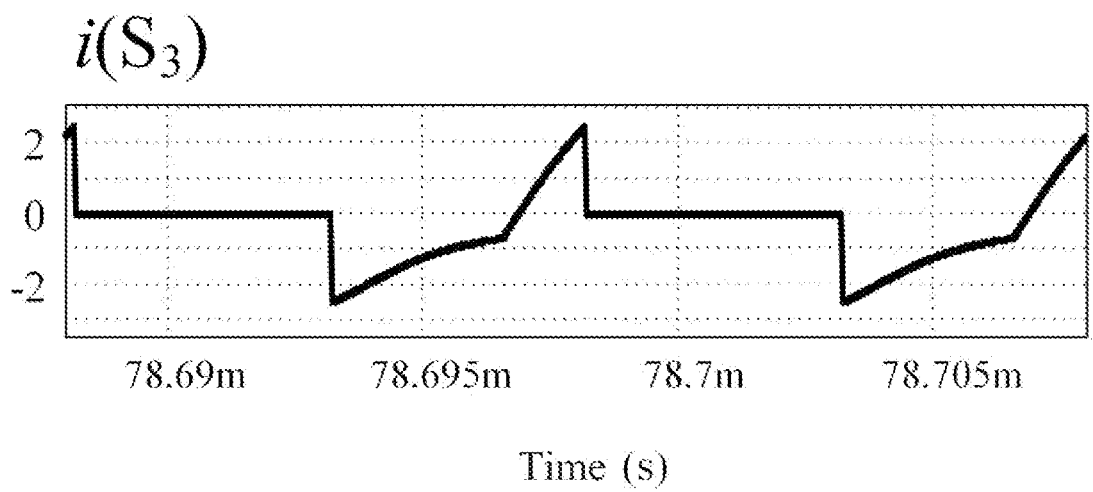
FIG. 8*i* illustrates a waveform diagram of $S_3$ when $V_{in}$=150 V, $V_{out}$=75 V, M=1, and $P_o$=50 W.
Figure 8J:
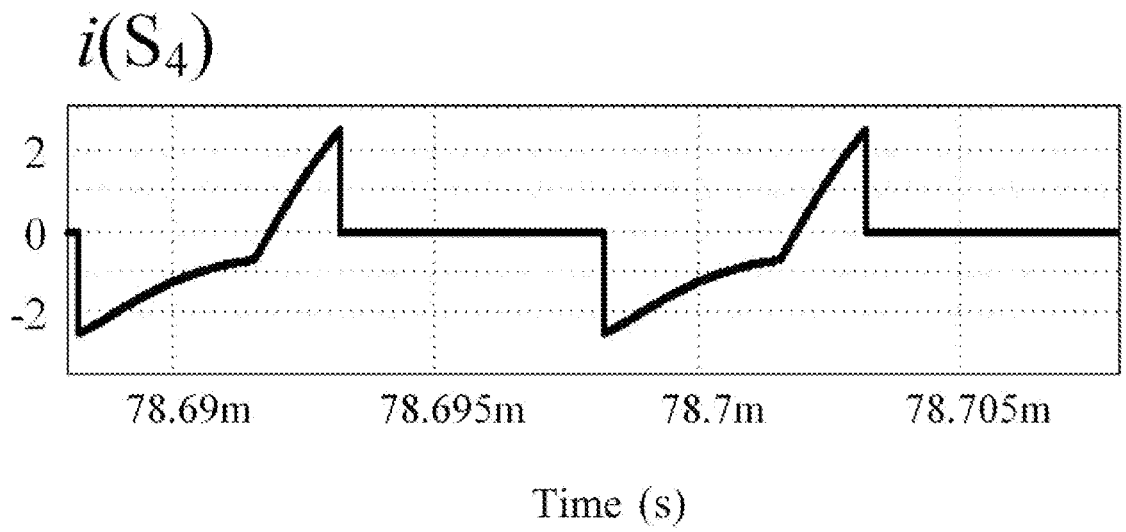
FIG. 8*j* illustrates a waveform diagram of $S_4$ when $V_{in}$=150 V, $V_{out}$=75 V, M=1, and $P_o$=50 W.
Figure 8K:
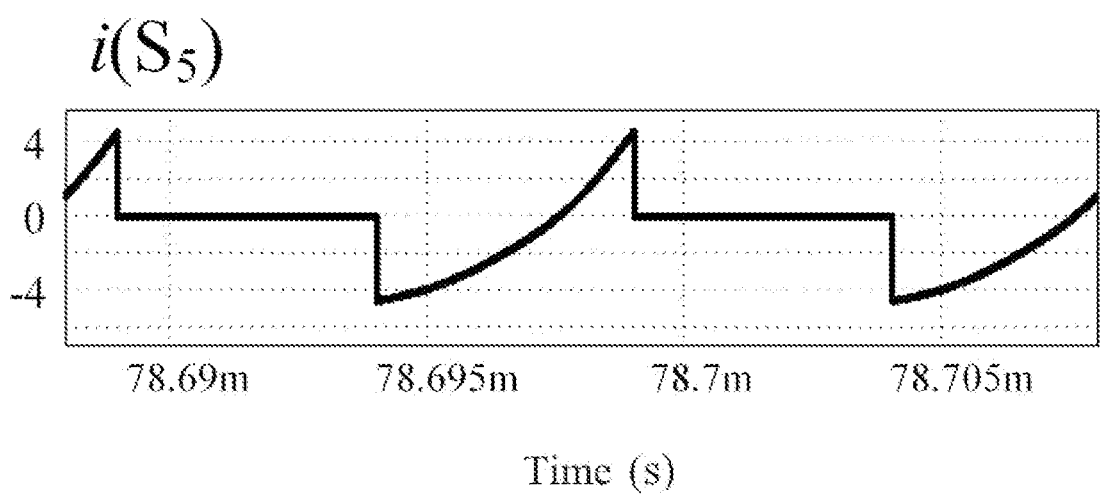
FIG. 8*k* illustrates a waveform diagram of $S_5$ when $V_{in}$=150 V, $V_{out}$=75 V, M=1, and $P_o$=50 W.
Figure 8L:
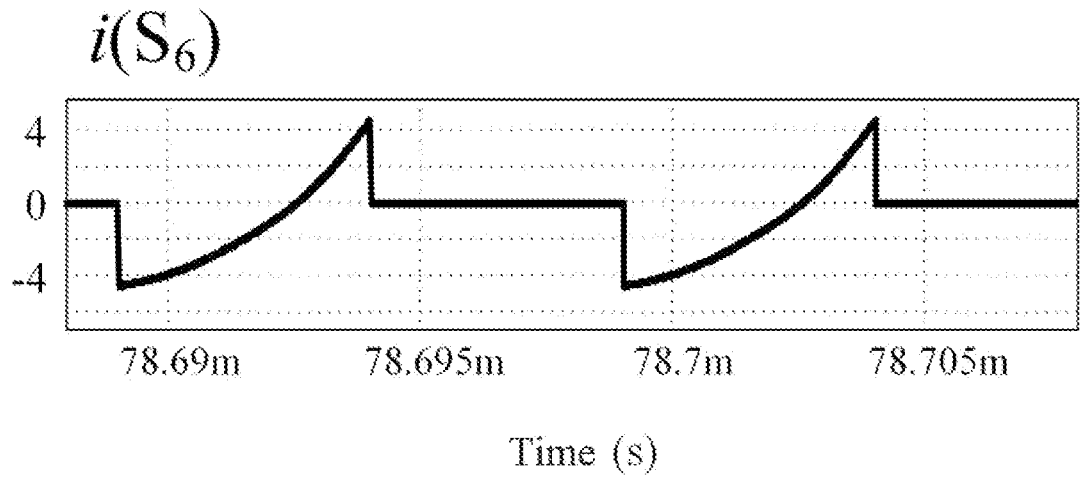
FIG. 8*l* illustrates a waveform diagram of $S_6$ when $V_{in}$=150 V, $V_{out}$=75 V, M=1, and $P_o$=50 W.

The two expressions represent a phase relationship between the resonant inductance and the current and a phase relationship between the resonant inductance and the voltage, as shown in FIG. 4. The current is of the resonant inductor L$_1$ leads the secondary side voltage v$_{cd}$ by an angle of 90°, while the current i$_2$ of resonant inductor L$_2$ lags the primary voltage by an angle of 90°.

Then a fundamental harmonic approximation method is to perform a steady-state analysis on the high-frequency alternating voltage v$_{ab}$ and the high-frequency alternating voltage v$_{cd}$, thereby obtaining a Fourier fundamental wave phasor expression of the high-frequency alternating voltage v$_{ab}$ and a Fourier fundamental wave phasor expression of the high-frequency alternating voltage v$_{cd}$ expressed as:

$$\overline{v_{ab}} = \frac{4V_{in}}{\sqrt{2}\pi}\sin\frac{\alpha}{2}\angle 0$$

$$\overline{v'_{cd}} = \frac{2V_{out}}{\sqrt{2}\,n\pi}\angle-\varphi$$

Based on the Fourier fundamental wave phasor expression of the high-frequency alternating voltage $v_{ab}$ and the Fourier fundamental wave phasor expression of the high-frequency alternating voltage $v_{cd}$, a Fourier fundamental wave phasor expression of the current $i_1$ and a Fourier fundamental wave phasor expression of the current $i_2$ are obtained and expressed as:

$$\overline{i_1} = \frac{2V_{out}}{\sqrt{2}\,n\pi\omega_s L_r}\angle-\varphi+\frac{\pi}{2}$$

$$\overline{i_2} = \frac{4V_{in}}{\sqrt{2}\,\pi\omega_s L_r}\sin\frac{\alpha}{2}\angle-\frac{\pi}{2}$$

where $V_{in}$ represents the input voltage and $V_{out}$ represents the output voltage.

Specifically, when the current phase of the current $i_1$ of the resonant inductor $L_1$ is adjusted to $$(\pi-\alpha)/2,\ -\varphi+\frac{\pi}{2}=-\left(\frac{\pi-\alpha}{2}\right),$$

that is to say, $$\varphi = \pi - \frac{\alpha}{2};$$

and an output power $P_o$ is expressed as $$P_o = \frac{4V_{in}V_{out}}{n\pi^2\omega_s L_r}\sin^2\frac{\alpha}{2}.$$

An expression defining a voltage gain M is as follows:

$$M = \frac{v'_{cd}}{v_{ab}} = \frac{V_{out}}{nV_{in}}$$

and the expression for the output power $P_o$ is simplified as:

$$P_o = \frac{4MV_{in}^2}{\pi^2\omega_s L_r}\sin^2\frac{\alpha}{2}.$$

In an embodiment, a non-transitory computer storage medium is provided. The computer storage medium stores a computer program, and the soft switching modulation method for the above T-type LCL resonant converter under the full power range is performed when the computer program is executed.

In an embodiment, a soft switching modulation system for the above T-type LCL resonant converter under the full power range is provided. The soft switching modulation system includes:

a primary side high-frequency voltage waveform adjustment part, configured for: in a cycle, adjusting pulse widths of the switching transistor $S_1$, the switching transistor $S_2$, the switching transistor $S_3$, and the switching transistor $S_4$ to obtain a high-frequency alternating voltage $v_{ab}$ of the primary side with a symmetrical waveform having three electrical levels, an amplitude equal to $V_{in}$, an adjustable positive pulse width, and an adjustable negative pulse width;

a secondary side high-frequency voltage waveform adjustment part, configured for: in the cycle, adjusting pulse widths of the switching transistor $S_5$ and the switching transistor $S_6$ to obtain a high-frequency alternating voltage $v_{cd}$ of the secondary side with a square waveform having two electrical levels, an amplitude equal to 0.5 $V_{out}$, a constant positive pulse width equal to $\pi$, and a constant negative pulse width equal to $\pi$; $V_{in}$ represents an input voltage and $V_{out}$ represents an output voltage; and a phase adjustment part, configured for: adjusting a current phase of a current it of the resonant inductor $L_1$ to $(\pi-\alpha)/2$, thereby enabling the T-type LCL resonant converter to achieve soft switching operations of the switching transistor $S_1$, the switching transistor $S_2$, the switching transistor $S_3$, the switching transistor $S_4$, the switching transistor $S_5$, and the switching transistor $S_6$ under the full power range; a represents an angle that makes the switching transistor $S_1$ and the switching transistor $S_4$ be turned on simultaneously.

Based on the cooperation of the three parts, soft switching of all switching transistors under the full power range of the converter has been achieved.

Specifically, key parameters are designed as follows:
$\omega_s=200k\pi$ rad/s, the input voltage $V_{in}=150$ V, the output voltage $V_{out}=75$ V, and the output power $P_o=200$ W are selected; the T-type LCL resonant converter converts 150 V to 75 V; and key parameters are obtained:

$$n = \frac{1}{2},$$

$L_1=L_2=72.57$ microhenry (μH), and $C=34.9$ nanofarads (nF).

To verify the buried theory analysis, the above parameters will be used for simulation in a power simulation (PSIM) software.

Next, simulation verification of the actual effect of the present disclosure will be conducted under the output power, as shown in FIGS. 5a-8l.

From this, it can be seen that the T-type LCL resonant converter can achieve the soft switching operations of all switching transistors under the full power range, thereby minimizing switching losses and greatly improving the efficiency of the converter.

The above embodiments are preferred embodiments of the present disclosure, but the embodiments of the present disclosure are not limited by the above embodiments. Any other changes, modifications, substitutions, combinations, or simplifications that do not deviate from the spirit and principles of the present disclosure should be equivalent substitution methods and are included in the scope of protection of the present disclosure.

What is claimed is:

1. A soft switching modulation method for a T-type inductor-capacitor-inductor (LCL) resonant converter under a full power range, wherein the T-type LCL resonant converter is used, and the T-type LCL resonant converter comprises a primary side full bridge, a resonant tank, a high-frequency transformer, and a secondary side half bridge connected in that order; the primary full bridge comprises a first switching transistor ($S_1$), a second switching transistor ($S_2$), a third switching transistor ($S_3$), and a fourth switching transistor ($S_4$); the first switching transistor, the second switching transistor, the third switching transistor, and the fourth switching transistor form a full bridge inverter circuit; the resonant tank comprises a first resonant inductor ($L_1$), a second resonant inductor ($L_2$), and a resonant capacitor (C) disposed at a primary side; the first resonant inductor is connected to the second resonant inductor; the first resonant inductor is connected to a first connection point of the primary side full bridge; an end of the resonant capacitor is connected to a connection point between the first resonant inductor and the second resonant inductor; another end of the resonant capacitor is connected to a second connection point of the primary side full bridge; a turn ratio of the high-frequency transformer is 1:n, wherein "n" is defined; the secondary side half bridge comprises a fifth switching transistor ($S_5$) and a sixth switching transistor ($S_6$); the fifth switching transistor, the sixth switching transistor, a first equalizing capacitor ($C_{o1}$), and a second equalizing capacitor ($C_{o2}$) form a half bridge rectifier circuit; and the soft switching modulation method comprises the following steps:

step S01: in a cycle, adjusting pulse widths of the first switching transistor, the second switching transistor, the third switching transistor, and the fourth switching transistor to obtain a high-frequency alternating voltage ($v_{ab}$) of the primary side with a symmetrical waveform having three electrical levels, an amplitude equal to $V_{in}$, an adjustable positive pulse width, and an adjustable negative pulse width; in the cycle, adjusting pulse widths of the fifth switching transistor and the sixth switching transistor to obtain a high-frequency alternating voltage ($v_{cd}$) of the secondary side with a square waveform having two electrical levels, an amplitude equal to 0.5 $V_{out}$, a constant positive pulse width equal to π, and a constant negative pulse width equal to π; and $V_{in}$ represents an input voltage and $V_{out}$ represents an output voltage; and step S02: adjusting a current phase of a first current ($i_1$) of the first resonant inductor to (π−α)/2, thereby enabling the T-type LCL resonant converter to achieve soft switching operations of the first switching transistor, the second switching transistor, the third switching transistor, the fourth switching transistor, the fifth switching transistor, and the sixth switching transistor under the full power range; wherein α represents an angle that makes the first switching transistor and the fourth switching transistor be turned on simultaneously.

2. The soft switching modulation method for the T-type LCL resonant converter under the full power range as claimed in claim 1, wherein in the step S01, the adjusting pulse widths of the first switching transistor, the second switching transistor, the third switching transistor, and the fourth switching transistor to obtain a high-frequency alternating voltage ($v_{ab}$) of the primary side comprises:

adjusting the pulse widths of the first switching transistor, the second switching transistor, the third switching transistor, and the fourth switching transistor to achieve complementary conduction of the first switching transistor, the second switching transistor, the third switching transistor, and the fourth switching transistor with a duty cycle of 50%, adjusting the fourth switching transistor to lag the first switching transistor by a target angle, thereby obtaining the high-frequency alternating voltage of the primary side with the symmetrical waveform having the three electrical levels and the amplitude equal to $V_{in}$; and adjusting the angle α to obtain the adjustable positive pulse width and the adjustable negative pulse width.

3. The soft switching modulation method for the T-type LCL resonant converter under the full power range as claimed in claim 1, wherein in the step S01, the adjusting pulse widths of the fifth switching transistor and the sixth switching transistor to obtain the high-frequency alternating voltage ($v_{cd}$) of the secondary side comprises:

adjusting the pulse widths of the fifth switching transistor and the sixth switching transistor to achieve complementary conduction of the fifth switching transistor and the sixth switching transistor with a duty cycle of 50%, and adjusting a fundamental wave of the square waveform to lag a fundamental wave of the symmetrical waveform by a phase angle φ, thereby obtaining the square waveform having the two electrical levels and the amplitude equal to 0.5 out.

4. The soft switching modulation method for the T-type LCL resonant converter under the full power range as claimed in claim 1, wherein the first current ($i_1$) of the first resonant inductor and a second current ($i_2$) of the second resonant inductor are calculated by:

based on an equivalent circuit of the T-type LCL resonant converter in a phasor domain, and using Kirchhoff's current law (KCL) and Kirchhoff's voltage law (KVL) to obtain two expressions:

$$\overline{v_{ab}} = j\left(\omega_s L_1 - \frac{1}{\omega_s C}\right)\overline{i_1} + \frac{j}{\omega_s C}\overline{i_2}$$

$$\overline{v'_{cd}} = j\left(\frac{1}{\omega_s C} - \omega_s L_2\right)\overline{i_2} - \frac{j}{\omega_s C}\overline{i_1}$$

where $\overline{v_{ab}}$ represents a phasor expression of the high-frequency alternating voltage of the primary side, $\overline{v'_{cd}}$ represents a phasor expression of the high-frequency alternating voltage of the secondary side converted to the primary side, $\overline{i_1}$ represents a phasor expression of the first current of the first resonant inductor, $\overline{i_2}$ represents a phasor expression of the second current of the resonant second inductor, $\omega_s$ represents a switching angular frequency, and C represents a resonant capacitance;

when the T-type LCL resonant converter operates in a resonant operation mode, the switching angular frequency is equal to a resonant angular frequency y, and the following formula is obtained:

$$\omega_s = \omega_r = \sqrt{\frac{c}{L_r}};$$

in the formula, $L_r=L_1=L_\alpha$, simplifying the two expressions as:

$$\overline{v_{ab}} = \frac{j}{\omega_s C}\overline{i_2}$$

$$\overline{v'_{cd}} = -\frac{j}{\omega_s C}\overline{i_1}$$

performing, by using a fundamental harmonic approximation method, a steady-state analysis on the high-frequency alternating voltage and the high-frequency alternating voltage, thereby obtaining a Fourier fundamental wave phasor expression of the high-frequency alternating voltage and a Fourier fundamental wave phasor expression of the high-frequency alternating voltage expressed as:

$$\overline{v_{ab}} = \frac{4V_{in}}{\sqrt{2}\pi}\sin\frac{a}{2} \angle 0$$

$$\overline{v_{cd}} = \frac{2V_{out}}{\sqrt{2}n\pi} \angle -\varphi,$$

obtaining, based on the Fourier fundamental wave phasor expression of the high-frequency alternating voltage and the Fourier fundamental wave phasor expression of the high-frequency alternating voltage, a Fourier fundamental wave phasor expression of the first current and a Fourier fundamental wave phasor expression of the second current expressed as:

$$\overline{i_1} = \frac{2V_{out}}{\sqrt{2}n\pi\omega_s L_r} \angle -\varphi + \frac{\pi}{2}$$

$$\overline{i_2} = \frac{4V_{in}}{\sqrt{2}\pi\omega_s L_r}\sin\frac{\alpha}{2} \angle -\frac{\pi}{2}$$

where $V_{in}$ represents the input voltage and $V_{out}$ represents the output voltage.

5. The soft switching modulation method for the T-type LCL resonant converter under the full power range as claimed in claim 4, wherein when the current phase of the first current of the first resonant inductor is adjusted to $$(\pi-\alpha)/2, -\varphi+\frac{\pi}{2} = -\left(\frac{\pi-a}{2}\right),$$

that is to say, $$\varphi = \pi - \frac{a}{2};$$

and an output power is expressed as $$P_o = \frac{4V_{in}V_{out}}{a\pi^2\omega_s L_r}\sin^2\frac{a}{2}.$$

6. A non-transitory computer storage medium, wherein the computer storage medium stores a computer program, and the soft switching modulation method for the T-type LCL resonant converter under the full power range as claimed in claim 1 is performed when the computer program is executed.

7. A soft switching modulation system for a T-type LCL resonant converter under a full power range, wherein the T-type LCL resonant converter is used, and the T-type LCL resonant converter comprises a primary side full bridge, a resonant tank, a high-frequency transformer, and a secondary side half bridge connected in that order; the primary full bridge comprises a first switching transistor ($S_1$), a second switching transistor ($S_2$), a third switching transistor ($S_3$), and a fourth switching transistor ($S_4$); the first switching transistor, the second switching transistor, the third switching transistor, and the fourth switching transistor form a full bridge inverter circuit; the resonant tank comprises a first resonant inductor ($L_1$), a second resonant inductor ($L_2$), and a resonant capacitor (C disposed at a primary side; the first resonant inductor is connected to the second resonant inductor; the first resonant inductor is connected to a first connection point of the primary side full bridge; an end of the resonant capacitor is connected to a connection point between the first resonant inductor and the second resonant inductor; another end of the resonant capacitor is connected to a second connection point of the primary side full bridge; a turn ratio of the high-frequency transformer is 1:n, wherein "n" is defined; the secondary side half bridge comprises a fifth switching transistor ($S_5$) and a sixth switching transistor ($S_6$); the fifth switching transistor, the sixth switching transistor, a first equalizing capacitor ($C_{o1}$), and a second equalizing capacitor ($C_{o2}$) form a half bridge rectifier circuit; and the soft switching modulation system comprises:

a primary side high-frequency voltage waveform adjustment part, configured for: in a cycle, adjusting pulse widths of the first switching transistor, the second switching transistor, the third switching transistor, and the fourth switching transistor to obtain a high-frequency alternating voltage ($v_{ab}$) of the primary side with a symmetrical waveform having three electrical levels, an amplitude equal to $V_{in}$, an adjustable positive pulse width, and an adjustable negative pulse width;

a secondary side high-frequency voltage waveform adjustment part, configured for: in the cycle, adjusting pulse widths of the fifth switching transistor and the sixth switching transistor to obtain a high-frequency alternating voltage ($v_{cd}$) of the secondary side with a square waveform having two electrical levels, an amplitude equal to 0.5 $V_{out}$, a constant positive pulse width equal to $\pi$, and a constant negative pulse width equal to $\pi$; wherein $V_{in}$ represents an input voltage and $V_{out}$ represents an output voltage; and a phase adjustment part, configured for: adjusting a current phase of a first current ($i_1$) of the first resonant inductor to ($\pi-\alpha$)/2, thereby enabling the T-type LCL resonant converter to achieve soft switching operations of the first switching transistor, the second switching transistor, the third switching transistor, the fourth switching transistor, the fifth switching transistor, and the sixth switching transistor under the full power range; wherein $\alpha$ represents an angle that makes the first switching transistor and the fourth switching transistor be turned on simultaneously.

8. The soft switching modulation system for the T-type LCL resonant converter under the full power range as claimed in claim 7, wherein in the primary side high-frequency voltage waveform adjustment part, the adjusting pulse widths of the first switching transistor, the second switching transistor, the third switching transistor, and the fourth switching transistor to obtain a high-frequency alternating voltage ($v_{ab}$) of the primary side comprises:

adjusting the pulse widths of the first switching transistor, the second switching transistor, the third switching transistor, and the fourth switching transistor to achieve complementary conduction of the first switching transistor, the second switching transistor, the third switching transistor, and the fourth switching transistor with a duty cycle of 50%, adjusting the fourth switching transistor to lag the first switching transistor by a target angle, thereby obtaining the high-frequency alternating voltage of the primary side with the symmetrical waveform having the three electrical levels and the amplitude equal to $V_{in}$; and adjusting the angle α to obtain the adjustable positive pulse width and the adjustable negative pulse width.

* * * * *